US011972719B2

(12) United States Patent
Yang et al.

(10) Patent No.: US 11,972,719 B2
(45) Date of Patent: Apr. 30, 2024

(54) DISPLAY DEVICE AND METHOD OF DRIVING THE SAME

(71) Applicant: SAMSUNG DISPLAY CO., LTD., Yongin-si (KR)

(72) Inventors: Su Min Yang, Yongin-si (KR); Seung Ho Park, Yongin-si (KR); Sung Hoon Bang, Yongin-si (KR); Sang Jae Yeo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/868,220

(22) Filed: Jul. 19, 2022

(65) Prior Publication Data

US 2023/0119909 A1 Apr. 20, 2023

(30) Foreign Application Priority Data

Oct. 20, 2021 (KR) ........................ 10-2021-0140475

(51) Int. Cl.
*G09G 3/32* (2016.01)
*G09G 3/20* (2006.01)
(Continued)

(52) U.S. Cl.
CPC ......... *G09G 3/2092* (2013.01); *G09G 3/3225* (2013.01); *G09G 3/3233* (2013.01);
(Continued)

(58) Field of Classification Search
CPC .. G09G 3/2092; G09G 3/3225; G09G 3/3233; G09G 3/3266; G09G 3/3275;
(Continued)

(56) References Cited

U.S. PATENT DOCUMENTS 9,035,976 B2 5/2015 Lee et al.
9,922,598 B2 3/2018 Park et al.
(Continued)

FOREIGN PATENT DOCUMENTS

KR 101528148 B1 6/2015
KR 102160815 B1 9/2020
(Continued)

*Primary Examiner* — Adam J Snyder
(74) *Attorney, Agent, or Firm* — CANTOR COLBURN LLP

(57) ABSTRACT

A display device and a method of driving a display device are disclosed. The display device includes pixels respectively connected to corresponding scan lines, corresponding control lines, corresponding data lines, and corresponding sensing lines, a scan driver which supplies a scan signal to a scan line of the corresponding scan lines, and supplies a control signal to a control line of the corresponding control lines, a data driver which supplies one of an image data signal and a sensing data signal to a data line of the corresponding data lines, and a sensing driver which senses characteristics of driving transistors of different pixels of the pixels in a previous sensing period and a current sensing period, and determines a final sensing value of a target pixel of the pixels in the current sensing period, based on a difference between a previous sensing value of the target pixel, which is determined based on the sensing in the previous sensing period, and a preliminary sensing value of the target pixel, which is calculated based on the sensing in the current sensing period.

20 Claims, 16 Drawing Sheets

(51) Int. Cl.

| | |
|---|---|
| *G09G 3/3225* | (2016.01) |
| *G09G 3/3233* | (2016.01) |
| *G09G 3/3266* | (2016.01) |
| *G09G 3/3275* | (2016.01) |

(52) U.S. Cl.

CPC ......... *G09G 3/3266* (2013.01); *G09G 3/3275* (2013.01); *G09G 2300/0828* (2013.01); *G09G 2300/0842* (2013.01); *G09G 2310/027* (2013.01); *G09G 2310/0278* (2013.01); *G09G 2320/0233* (2013.01); *G09G 2320/0285* (2013.01); *G09G 2320/0295* (2013.01); *G09G 2320/043* (2013.01); *G09G 2320/045* (2013.01); *G09G 2320/048* (2013.01); *G09G 2330/026* (2013.01); *G09G 2330/027* (2013.01); *G09G 2360/16* (2013.01)

(58) Field of Classification Search

CPC ... G09G 2300/0828; G09G 2300/0842; G09G 2310/027; G09G 2310/0278; G09G 2320/0233; G09G 2320/0285; G09G 2320/0295; G09G 2320/043; G09G 2320/045; G09G 2320/048; G09G 2330/026; G09G 2330/027; G09G 2360/16

See application file for complete search history.

(56) References Cited

U.S. PATENT DOCUMENTS

| | | | | |
|---|---|---|---|---|
| 2016/0133193 | A1* | 5/2016 | Lee ...................... | G09G 3/3275 345/694 |
| 2016/0189618 | A1* | 6/2016 | Park ..................... | G09G 3/3266 345/77 |
| 2018/0082639 | A1* | 3/2018 | Shin ..................... | G09G 3/3216 |
| 2021/0150966 | A1 | 5/2021 | Yang et al. | |

FOREIGN PATENT DOCUMENTS

| | | | |
|---|---|---|---|
| KR | 102166448 | B1 | 10/2020 |
| KR | 102322708 | B1 | 11/2021 |

* cited by examiner

PG1: P11, P13, P15, P22, P24, P26, P31, P33, P35, P42, P44, P46, P51, P53, P55, P62, P64, P66
PG2: P12, P14, P16, P21, P23, P25, P32, P34, P36, P41, P43, P45, P52, P54, P56, P61, P63, P65

PG1: P11, P13, P15, P22, P24, P26, P31, P33, P35, P42, P44, P46, P51, P53, P55, P62, P64, P66
PG2: P12, P14, P16, P21, P23, P25, P32, P34, P36, P41, P43, P45, P52, P54, P56, P61, P63, P65

410: 411, 412
430: 431, 432

DISPLAY DEVICE AND METHOD OF DRIVING THE SAME

This application claims priority to Korean patent application 10-2021-0140475, filed on Oct. 20, 2021, and all the benefits accruing therefrom under 35 U.S.C. § 119, the content of which in its entirety is herein incorporated by reference.

BACKGROUND

1. Field

Embodiments of the invention generally relate to a display device and a method of driving the same, and more particularly, to a display device to which an external compensation manner is applied, and a method of driving the display device.

2. Description of the Related Art

A display device displays an image by pixels connected to a plurality of scan lines and a plurality of data lines. Each of the pixels includes a light-emitting element and a driving transistor.

The driving transistor controls an amount of current supplied to the light-emitting element, corresponding to a data signal supplied from a data line. The light-emitting element generates light with a predetermined luminance corresponding to the amount of current supplied from the driving transistor.

SUMMARY

In order for a display device to display an image having uniform image quality, a driving transistor included in each of pixels is desired to supply a uniform current to a light-emitting element, corresponding to the data signal. However, the driving transistor included in each of the pixels has a unique characteristic value with which a deviation may exist. A threshold voltage and mobility of the driving transistor may be differently set in each of the pixels, for example, and be changed by degradation due to use of the driving transistor. Accordingly, a luminance deviation may occur in an image.

Embodiments provide a display device for performing external compensation sensing on only some of pixels, and determining a final sensing value of a target pixel which is not currently actually sensed, based on a difference between a previous actual sensing value and a currently interpolated sensing value of the target pixel.

Embodiments also provide a method of driving the display device.

In an embodiment of the invention, there is provided a display device including a plurality of pixels respectively connected to corresponding scan lines, corresponding control lines, corresponding data lines, and corresponding sensing lines, a scan driver which supplies a scan signal to a scan line of the corresponding scan lines, and supplies a control signal to a control line of the corresponding control lines, a data driver which supplies one of an image data signal and a sensing data signal to a data line of the corresponding data lines, and a sensing driver which senses characteristics of driving transistors of different pixels of the plurality of pixels in a previous sensing period and a current sensing period, and determine a final sensing value of a target pixel of the plurality of pixels in the current sensing period, based on a difference between a previous sensing value of the target pixel, which is determined based on the sensing in the previous sensing period, and a preliminary sensing value of the target pixel, which is calculated based on the sensing in the current sensing period.

In an embodiment, the sensing driver may calculate the preliminary sensing value of the target pixel by interpolating sensing values of pixels adjacent to the target pixel.

In an embodiment, the previous sensing value of the target pixel may be a real sensing value determined by a sensing signal provided from a sensing line, among the corresponding sensing lines, connected to the target pixel.

In an embodiment, the sensing driver may determine one of the previous sensing value and the preliminary sensing value as the final sensing value.

In an embodiment, the sensing driver may include an analog front end shared by at least two sensing lines of the corresponding sensing lines.

In an embodiment, the sensing driver may further include a sensing line controller which controls a connection between the at least two sensing lines of the corresponding sensing lines and the analog front end to sense a first pixel group of the plurality of pixels in the previous sensing period and to sense a second pixel group of the plurality of pixels in the current sensing period, an analog-digital converter which outputs digital real sensing values of a plurality of second pixels included in the second pixel group, based on a signal provided from the analog front end in the current sensing period, an interpolator which calculates preliminary sensing values of a plurality of first pixels which are included in the first pixel group and not sensed in the current sensing period by interpolating the real sensing values of the second pixel group, a difference calculator which calculates a sensing value difference as the difference between the previous sensing value of the target pixel sensed in the previous sensing period and the preliminary sensing value of the target pixel, and a sensing value determiner which determines the final sensing value of the target pixel by comparing the sensing value difference with a predetermined reference value.

In an embodiment, when the sensing value difference is greater than the predetermined reference value, the sensing value determiner may determine the previous sensing value of the target pixel as the final sensing value of the target pixel.

In an embodiment, when the sensing value difference is equal to or smaller than the predetermined reference value, the sensing value determiner may determine the preliminary sensing value of the target pixel as the final sensing value of the target pixel.

In an embodiment, the display device may further include a memory which stores sensing line option information corresponding to pattern information of pixels sensed in the previous sensing period and the previous sensing value of each of the pixels. The sensing line controller may control sensing lines selected in the current sensing period among the corresponding sensing lines, based on the sensing line option information. The difference calculator may read the previous sensing value of each of pixels except the second pixel group from the memory, corresponding to the current sensing period.

In an embodiment, the sensing value determiner may update the final sensing value in the memory.

In an embodiment, the display device may further include a stress accumulator which accumulates stress data of each of the plurality of pixels, based on image data. The sensing driver may further include a reference value determiner which varies a reference value with respect to each of the plurality of pixels, based on the stress data.

In an embodiment, when the stress data of the target pixel is greater than a predetermined threshold value, the reference value determiner may increase the reference value used for the target pixel.

In an embodiment, the sensing driver may further include a compensator which determines a compensation value of image data, based on the final sensing value.

In an embodiment, the analog front end is shared by two sensing lines of the corresponding sensing lines.

In an another embodiment of the invention, there is provided a method of driving a display device, the method including outputting first sensing signals from a first pixel group in a previous sensing period, and generating a previous sensing value of each of a plurality of first pixels of the first pixel group of a plurality of pixels, based on the first sensing signals, outputting second sensing signals from a second pixel group different from the first pixel group in a current sensing period, and generating real sensing values of a plurality of second pixels of the second pixel group of the plurality of pixels, based on the second sensing signals, calculating a preliminary sensing value of each of the plurality of first pixels of the first pixel group by interpolating the real sensing values, corresponding to the current sensing period, determining a final sensing value of each of the plurality of first pixels of the first pixel group, based on a difference between the previous sensing value and the preliminary sensing value, and compensating for image data, based on the real sensing values and the final sensing value.

In an embodiment, the final sensing value of each of the plurality of first pixels of the first pixel group may be determined as one of the previous sensing value and the preliminary sensing value.

In an embodiment, the determining the final sensing value may include calculating a sensing value difference as the difference between the previous sensing value and the preliminary sensing value, comparing the sensing value difference with a predetermined reference value, determining the previous sensing value as the final sensing value of a target pixel of the plurality of first pixels of the first pixel group, when the sensing value difference is greater than the predetermined reference value, and determining the preliminary sensing value as the final sensing value of the target pixel, when the sensing value difference is equal to or smaller than the predetermined reference value.

In an embodiment, the comparing the sensing value difference with the predetermined reference value may include generating stress data of each of the plurality of pixels by accumulating the image data, comparing the stress data with a predetermined threshold value, setting a first value as the predetermined reference value, when the stress data is equal to or smaller than the predetermined threshold value, and setting a second value greater than the first value as the predetermined reference value, when the stress data exceeds the predetermined threshold value.

In another embodiment of the invention, there is provided a display device including a plurality of pixels respectively connected corresponding sensing lines, and a sensing driver which generates first real sensing values, based on sensing signals provided from a plurality of first pixels of a first pixel group of the plurality of pixels in a first sensing period, and generate second real sensing values, based on sensing signals provided from a plurality of second pixels of a second pixel group of the plurality of pixels in a second sensing period, where the sensing driver calculates a preliminary sensing value of a target pixel included in the plurality of first pixels of the first pixel group by interpolating the second real sensing values of a portion of the plurality of second pixels of the second pixel group, which are adjacent to the target pixel, and determines a final sensing value of the target pixel corresponding to the second sensing period, based on a difference between a real sensing value of the target pixel among the first real sensing values and the preliminary sensing value of the target pixel.

In an embodiment, the sensing driver may determine one of the real sensing value of the target pixel and the preliminary sensing value of the target pixel as the final sensing value of the target pixel, and compensate for image data of the target pixel, based on the final sensing value of the target pixel.

In embodiments of the display device and the method of driving the same in accordance with the invention, only some of an entirety of pixels may be actually sensed in a sensing period, a sensing value of pixels which are not sensed is calculated through interpolation, so that a pixel sensing time for external compensation may be decreased.

Further, a final sensing value of a target pixel may be determined according to a difference between an interpolated sensing value (e.g., a preliminary sensing value) of the target pixel and a previous real sensing value, so that occurrence of an interpolation error may be reduced while decreasing the sensing time. Thus, sensing reliability and image quality may be improved.

BRIEF DESCRIPTION OF THE DRAWINGS

Embodiments will now be described more fully hereinafter with reference to the accompanying drawings.

DETAILED DESCRIPTION

Figure 1:
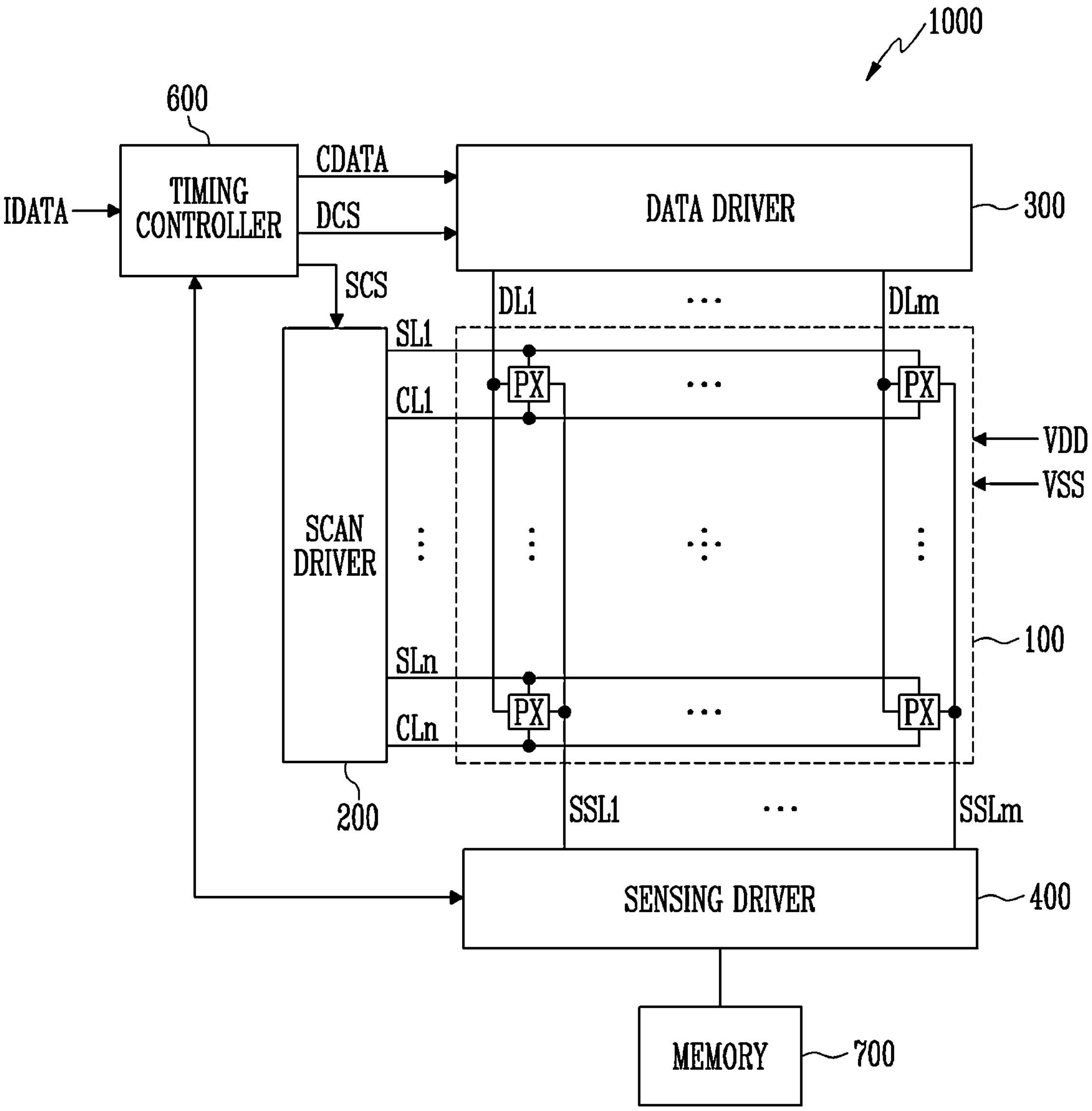
FIG. 1 is a block diagram illustrating an embodiment of a display device in accordance with the invention.

Hereinafter, embodiments of the invention will be described in detail with reference to the accompanying drawings. Throughout the drawings, the same reference numerals are given to the same elements, and their overlapping descriptions will be omitted. Embodiments of the invention may be implemented in various different forms and is not limited to the embodiments described in the specification.

In the drawing figures, dimensions may be exaggerated for clarity of illustration. It will be understood that when an element is referred to as being "between" two elements, it may be the only element between the two elements, or one or more intervening elements may also be present. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

FIG. 1 is a block diagram illustrating an embodiment of a display device in accordance with the invention.

Referring to FIG. 1, the display device 1000 may include a pixel unit 100, a scan driver 200, a data driver 300, a sensing driver 400, and a timing controller 600. In an embodiment, the display device 1000 may further include a memory 700.

Whether functional units are to be integrated in one integrated circuit ("IC"), to be integrated in a plurality of ICs, or to be disposed (e.g., mounted) on a display substrate may be variously configured according to specifications of the display device 1000. In an embodiment, at least some functions of the timing controller 600, the data driver 300, and the sensing driver 400 may be integrated in one IC, for example.

The display device 1000 may include various types of display devices such as a flat panel display device, a flexible display device, a curved display device, a foldable display device, or a bendable display device. Also, the display device 1000 may be applied to a head-mounted display device, a wearable display device, or the like. Also, the display device 1000 may be applied to various electronic devices including a smartphone, a tablet, a smart pad, a television ("TV"), a monitor, or the like.

In an embodiment, the display device 1000 may be implemented as an organic light-emitting display device, a liquid crystal display device, or the like. However, this is merely illustrative, and the configuration of the display device 1000 is not limited thereto. In an embodiment, the display device 1000 may be a display device including an inorganic light-emitting element, a quantum dot/well light-emitting diode, or an inorganic/organic complex light-emitting element, for example.

In an embodiment, the display device 1000 may be driven in a frame which is divided into a display period for displaying an image and a sensing period for sensing a characteristic of a driving transistor included in each pixel PX.

The pixel unit 100 may include pixels PX disposed to be connected to data lines DL1 to DLm (m is a natural number greater than 0), scan lines SL1 to SLn (n is a natural number), control lines CL1 to CLn, and sensing lines SSL1 to SSLm. The pixels PX may be supplied with a first power voltage VDD and a second power voltage VSS from the outside.

Although n scan lines SL1 to SLn are illustrated in FIG. 1, the invention is not limited thereto. In an embodiment, at least one control line, at least one scan line, at least one emission control line, at least one sensing line, or the like may be additionally formed or provided in the pixel unit 100, corresponding to a circuit structure of the pixel PX.

In an embodiment, transistors included in the pixel PX may be implemented as an N-type oxide thin film transistor. In an embodiment, the oxide thin film transistor may be a low temperature polycrystalline oxide ("LTPO") thin film transistor, for example. However, this is merely illustrative, and the N-type transistors are not limited thereto. In an embodiment, an active pattern (semiconductor layer) included in the transistors may include an inorganic semiconductor (e.g., amorphous silicon and/or poly-silicon), an organic semiconductor, or the like, for example. In addition, at least one of transistors include in the display device 1000 may be replaced with a P-type transistor.

The timing controller 600 may generate a data driving control signal DCS and a scan driving control signal SCS, corresponding to synchronization signals supplied from the outside. The data driving control signal DCS may be supplied to the data driver 300, and the scan driving control signal SCS may be supplied to the scan driver 200.

Also, the timing controller 600 may supply compensated image data CDATA to the data driver 300, based on input image data IDATA supplied from the outside.

A source start signal and clock signals may be included in the data driving control signal DCS. The source start signal may control a sampling start time of data. The clock signals may be used to control a sampling operation.

A scan start signal, a control start signal, and clock signals may be included in the scan driving control signal SCS. The scan start signal may control a timing of a scan signal. The control start signal may control a timing of a control signal. The clock signals may be used to shift the scan start signal and/or the control start signal.

The timing controller 600 may further control an operation of the sensing driver 400. In an embodiment, the timing controller 600 may control a timing at which a reference voltage is supplied to the pixels PX through the sensing lines SSL1 to SSLm and/or a timing at which a current generated in the pixel PX is sensed through the sensing lines SSL1 to SSLm, for example.

The scan driver 200 may receive the scan driving control signal SCS from the timing controller 600. The scan driver 200 may supply scan signals to the scan lines SL1 to SLn, respectively, and supply control signals to the control lines CL1 to CLn, respectively, based on the scan driving control signal SCS.

In an embodiment, the scan driver 200 may sequentially supply the scan signals to the scan lines SL1 to SLn, respectively. When the scan signals are sequentially supplied to the scan lines SL1 to SLn, respectively, the pixels PX may be selected in units of horizontal lines. To this end, the scan signal may be set to a gate-on voltage (e.g., a logic high level) at which transistors included in the pixels PX may be turned on. However, the invention is not limited thereto, and the scan signal may also be set to a logic low level according to a type of the transistors included in the pixels PX.

Similarly, the scan driver 200 may supply the control signals to the control lines CL1 to CLn, respectively. The control signal may be used to sense (or extract) a driving current flowing in the pixel PX (i.e., a current flowing through the driving transistor of the pixel PX). Timings at which the scan signal and the control signal are supplied and waveforms of the scan signal and the control signal may be differently set according to the display period and the sensing period.

Although a case where one scan driver 200 outputs both the scan signal and the control signal is illustrated in FIG. 1, the invention is not limited thereto. In an embodiment, the scan driver 200 may include a first scan driver which supplies the scan signal to the pixel unit 100 and a second scan driver which supplies the control signal to the pixel unit 100, for example.

The data driver 300 may be supplied with the data driving control signal DCS from the timing controller 600. The data driver 300 may supply, to the pixel unit 100, a data signal (e.g., a sensing data signal) for pixel characteristic detection in the sensing period. The data driver 300 may supply a data signal for image display to the pixel unit 100, based on the compensated image data CDATA in the display period.

The sensing driver 400 may generate a compensation value for compensating for a characteristic value of each pixel PX, based on a sensing signal (e.g., a sensing current) provided from a corresponding sensing line of the sensing lines SSL1 to SSLm. In an embodiment, the sensing driver 400 may detect and compensate for a characteristic (e.g., a threshold voltage change and a mobility change) of the driving transistor included in the pixel PX, for example. Also, the sensing driver 400 may detect and compensate for a characteristic change or the like of a light-emitting element of the pixel PX.

In an embodiment, the sensing driver 400 may detect sensing signals from pixels of a first pixel group in a first sensing period (e.g., a previous sensing period), and detect sensing signals from pixels of a second pixel group in a second sensing period (e.g., a current sensing period). The first pixel group and the second pixel group may include different pixels.

In an embodiment, each of analog front ends AFE (refer to FIG. 4) of the sensing driver 400, which are connected to the sensing lines SSL1 to SSLm to receive sensing signals, may be connected to two or more sensing lines, for example. In an embodiment, first and second sensing lines SSL1 and SSL2 may share one analog front end, for example. Therefore, only some of the pixels PX may be sensed in each of the first sensing period and the second sensing period.

In some embodiments, the first sensing period and the second sensing period may be consecutively continued or be spaced apart from each other with a gap therebetween. In an embodiment, the sensing period may be activated by a turn-off command for the display device 1000, for example. That is, the first sensing period may progress in previous turn-off of the display device 1000, and the second sensing period may progress when the display device 1000 is again turned off after the display device 1000 is turned on.

When the pixels PX of the pixel unit 100 are sensed while being divided into the first pixel group and the second pixel group, the first pixel group may be first pixels actually sensed in an (N−1)-th (N is an integer greater than 1) sensing period, and the second pixel group may be second pixels actually sensed in an N-th sensing period. The first pixels and the second pixels may be different pixels. In an embodiment, the first pixels and the second pixels may be defined as ones alternately disposed in row and column directions, for example.

In an embodiment, in the (N−1)-th sensing period, sensing signals may be supplied to the sensing driver 400 from the first pixels (i.e., the first pixel group), and first group sensing values as actual sensing values of the first pixels may be generated. In addition, the sensing driver 400 may calculate preliminary sensing values of the second pixels through an interpolation operation on the first group sensing values.

When pixel sensing is not performed before the (N−1)-th sensing period, the preliminary sensing values of the second pixels may be determined as second group final sensing values in the (N−1)-th sensing period as they are. In an embodiment, the preliminary sensing values of the second pixels in the (N−1)-th sensing period may be substantially equal to the second group final sensing values of the second pixels in the (N−1)-th sensing period, for example.

In some embodiments, the sensing driver 400 may generate a sensing map corresponding to sensing data in the (N−1)-th sensing period by the first group sensing values and the second group final sensing values. In an embodiment, the sensing map in the (N−1)-th sensing period may correspond to sensing values corresponding to the respective pixels PX in the (N−1)-th sensing period, for example.

In an embodiment, in the N-th sensing period, sensing signals may be supplied to the sensing driver 400 from the second pixels (i.e., the second pixel group), and second group sensing values as actual sensing values of the second pixels may be generated. In addition, the sensing driver 400 may calculate preliminary sensing values of the first pixels through an interpolation operation on the second group sensing values.

In an embodiment, the sensing driver 400 may calculate final sensing values of the first pixels in the N-th sensing period, based on differences between the first group sensing values included in the sensing map in the (N−1)-th sensing period and the preliminary sensing values of the first pixels, which are calculated in the N-th sensing period. The final sensing values of the first pixels in the N-th sensing period may be defined as first group final sensing values.

The sensing driver 400 may generate a sensing map corresponding to sensing data of the pixels PX in the N-th sensing period by the first group final sensing values and the second group sensing values. In an embodiment, the sensing map in the N-th sensing period may correspond to sensing values corresponding to the respective pixels PX in the N-th sensing period, for example. In addition, in an (N+1)-th sensing period, sensing signals may be again supplied to the sensing driver 400 from the first pixels (i.e., the first pixel group) such that first group sensing values are generated (or updated), and preliminary sensing values of the second pixels may be calculated through an interpolation operation on the first group sensing values. The sensing driver 400 may calculate final sensing values of the second pixels in the (N+1)-th sensing period, based on differences between the second group sensing values included in the sensing map in the N-th sensing period and the preliminary sensing values of the second pixels, which are calculated in the (N+1)-th sensing period.

As described above, in the sensing period, only some of all the pixels may be sensed, and a sensing value of each of the other pixels which are not sensed may be determined as one selected from an interpolation value of currently sensed values and a previously actually sensed value.

In an embodiment, during each sensing period, the sensing driver 400 may supply a predetermined reference voltage to the pixels PX through the sensing lines SSL1 to SSLm, and be provided with a current or voltage extracted from the pixel PX. The extracted current or voltage may correspond to a sensing value, and the sensing driver 400 may detect a characteristic change of the driving transistor of the pixel, based on the sensing value. The sensing driver 400 may calculate a compensation value for compensating for the input image data IDATA, based on the detected characteristic change. The compensation value may be provided to the timing controller 600 or the data driver 300.

During the display period, the sensing driver 400 may supply, to the pixel unit 100, a predetermined reference voltage for image display through the sensing lines SSL1 to SSLm.

Although a case where the sensing driver 400 is a component separate from the timing controller 600 is illustrated in FIG. 1, at least some components and/or at least some functions (e.g., software components and/or hardware components) of the sensing driver 400 may be included in the timing controller 600. In an embodiment, the sensing driver 400 and the timing controller 600 may be formed or provided as one driving IC, for example. Moreover, the data driver 300 may also be included in the timing controller 600. Therefore, at least some of the sensing driver 400, the data driver 300, and the timing controller 600 may be formed or provided as one driving IC.

The memory 700 may store sensing values and compensation values, which are extracted through pixel sensing. Also, the memory 700 may store sensing line option information as information associated with a selected pixel group in a previous sensing period (e.g., the first sensing period). In some embodiments, the memory 700 may further include a lookup table necessary for image data compensation, or the like.

In an embodiment, the memory 700 may be a nonvolatile memory. In an embodiment, the memory 700 may be implemented as an erasable programmable read-only memory ("EPROM"), an electrically erasable programmable read-only memory ("EEPROM"), a flash memory, or the like, for example.

The sensing driver 400 may write generated data in the memory 700 or read necessary information in data stored in the memory 700, when necessary.

Figure 2:
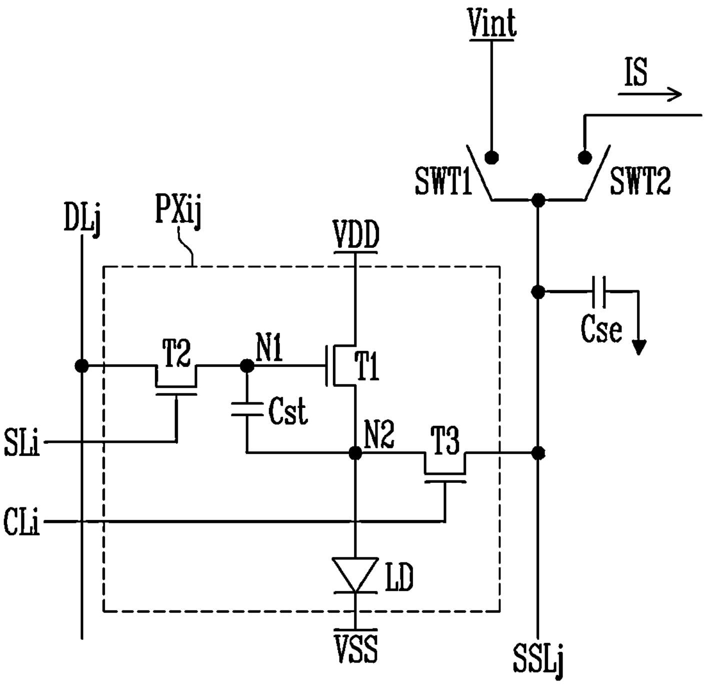
FIG. 2 is a diagram illustrating an embodiment of a pixel included in the display device shown in FIG. 1.

FIG. 2 is a diagram illustrating an embodiment of the pixel included in the display device shown in FIG. 1.

For convenience of description, a pixel PXij which is disposed on an ith horizontal line and is connected to a jth data line DLj will be illustrated in FIG. 2, where each of i and j is a natural number greater than 0.

Referring to FIGS. 1 and 2, the pixel PXij may include a light-emitting element LD, a first transistor T1 (driving transistor), a second transistor T2, a third transistor T3, and a storage capacitor Cst.

A first electrode (anode electrode or cathode electrode) of the light-emitting element LD may be connected to a second node N2, and a second electrode (cathode electrode or anode electrode) of the light-emitting element LD may be connected to a second power line to which the second power voltage VSS is provided. The light-emitting element LD generates light with a predetermined luminance corresponding to an amount of current supplied from the first transistor T1.

A first electrode of the first transistor T1 may be connected to a first power line to which the first power voltage VDD is provided, and a second electrode of the first transistor T1 may be connected to the first electrode of the light-emitting element LD. A gate electrode of the first transistor T1 may be connected to a first node N1. The first transistor T1 controls an amount of current flowing through the light-emitting element LD, corresponding to a voltage of the first node N1.

A first electrode of the second transistor T2 may be connected to the jth data line DLj, and a second electrode of the second transistor T2 may be connected to the first node N1. A gate electrode of the second transistor T2 may be connected to an ith scan line SLi (hereinafter, also referred to as a scan line SLi). The second transistor T2 may be turned on when a scan signal is supplied to the scan line SLi, to transfer a data signal from the jth data line DLj (hereinafter, also referred to as a data line DLj) to the first node N1.

The third transistor T3 may be connected between a jth sensing line SSLj (hereinafter, also referred to as a sensing line SSLj) and the second electrode of the first transistor T1 (i.e., the second node N2). A gate electrode of the third transistor T3 may be connected to an ith control line CLi (hereinafter, also referred to as a control line CLi). The third transistor T3 may be turned on when a control signal is supplied to the control line CLi, to electrically connect the sensing line SSLj and the second node N2 (i.e., the second electrode of the first transistor T1) to each other.

In an embodiment, when the third transistor T3 is turned on, a reference voltage Vint may be supplied to the second node N2. In another embodiment, when the third transistor T3 is turned on, a sensing signal (e.g., a sensing current IS) generated in the first transistor T1 may be supplied to the sensing driver 400.

The storage capacitor Cst may be connected between the first node N1 and the second node N2. The storage capacitor Cst may store a voltage corresponding to a voltage difference between the first node N1 and the second node N2.

In the embodiment of the invention, the circuit structure of the pixel PXij is not limited by FIG. 2. In an embodiment, the light-emitting element LD may be disposed between the first power line which provides the first power voltage VDD and the first electrode of the first transistor T1.

In an embodiment, the sensing line SSLj may be connected to a first switch SWT1 and a second switch SWT2. The first switch SWT1 and the second switch SWT2 may be integrated in a display panel in which the pixel unit 100 is disposed, or be included in the sensing driver 400.

The first switch SWT1 and the second switch SWT2 may be alternately turned on. When the first switch SWT1 is turned on, the reference voltage Vint may be supplied to the second node N2. Therefore, a voltage of the second node N2 (e.g., a source voltage of the first transistor T1) may be initialized to the reference voltage Vint. However, the invention is not limited thereto, and a voltage of the second node N2 may be a drain voltage of the first transistor T1 according to a type of the first transistor T1.

When the second switch SWT2 is turned on, the sensing current IS of the pixel PXij may flow into the sensing driver 400.

Although a case where the first to third transistors T1 to T3 are implemented with an n-channel metal-oxide-semiconductor ("NMOS") transistor is illustrated in FIG. 2, the invention is not limited thereto. In an embodiment, at least one of the first to third transistors T1 to T3 may be implemented with a p-channel metal-oxide-semiconductor ("PMOS") transistor.

Figure 3:
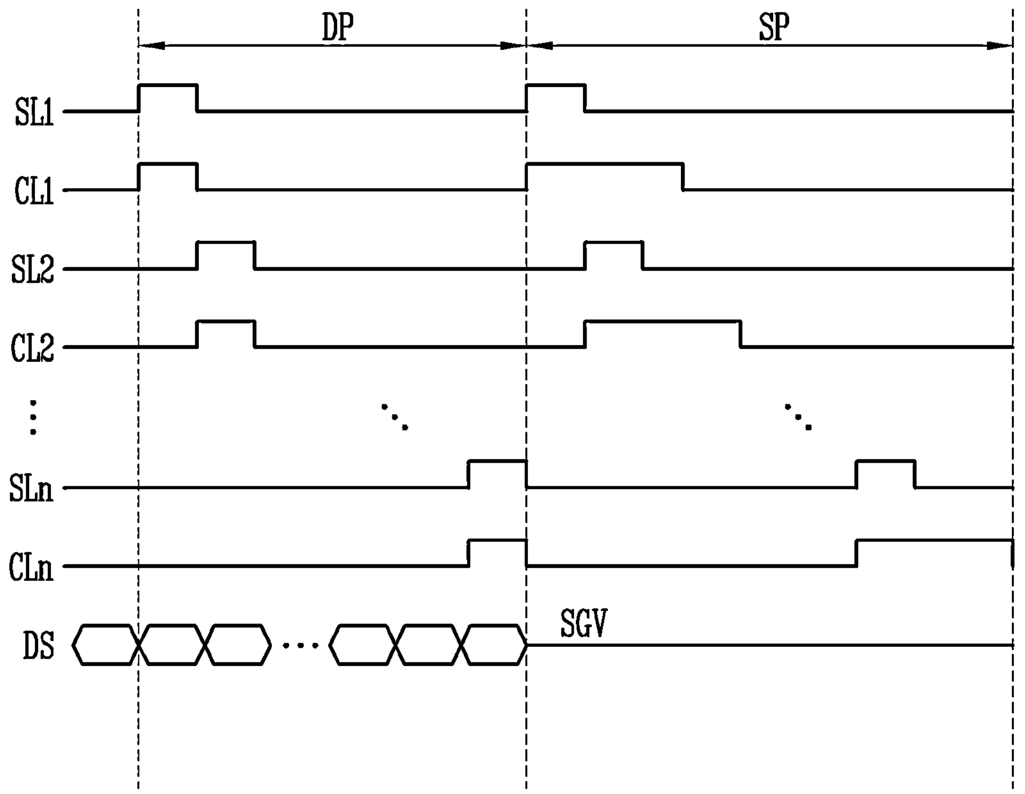
FIG. 3 is a timing diagram illustrating an embodiment of an operation of the display device shown in FIG. 1.

FIG. 3 is a timing diagram illustrating an embodiment of an operation of the display device shown in FIG. 1.

Referring to FIGS. 1, 2, and 3, the display device 1000 may be driven in a frame which is divided into a display period DP for displaying an image and a sensing period SP for sensing a characteristic of the first transistor T1 included in each of the pixels PX.

In an embodiment, in the sensing period SP, image data may be compensated based on sensed characteristic information.

During the display period DP, the first switch SWT1 may be turned on, and the second switch SWT2 may be set to a turn-off state. Therefore, the reference voltage Vint as a constant voltage may be supplied to the sensing line SSLj.

During the display period DP, the scan driver 200 may sequentially supply scan signals to the scan lines SL1 to SLn, respectively. Also, during the display period DP, the scan driver 200 may sequentially supply control signals to the control lines CL1 to CLn, respectively. With respect to the ith horizontal line, the scan signal and the control signal may be substantially simultaneously supplied. Therefore, the second transistor T2 and the third transistor T3 may be simultaneously turned on or turned off.

When the second transistor T2 is turned on, a data signal DS corresponding to image data may be supplied to the first node N1. When the third transistor T3 is turned on, the reference voltage Vint may be supplied to the second node N2. Therefore, the storage capacitor Cst may store a voltage corresponding to a voltage difference between the data signal DS and the reference voltage Vint.

Since the reference voltage Vint is set as the static voltage, the voltage stored in the storage capacitor Cst may be stably determined by the data signal DS.

When the supply of the scan signal and the control signal to the scan line SLi and the control line CLi is suspended, the second transistor T2 and the third transistor T3 may be turned off.

Subsequently, the first transistor T1 may control an amount of current (driving current) supplied to the light-emitting element LD, corresponding to the voltage stored in the storage capacitor Cst. Accordingly, the light-emitting element LD may emit light with a luminance corresponding to the driving current of the first transistor T1.

In an embodiment, during the sensing period SP, the scan driver 200 may sequentially supply scan signals to the scan lines SL1 to SLn, respectively. Also, during the sensing period SP, the scan driver 200 may sequentially supply control signals to the control lines CL1 to CLn, respectively.

In an embodiment, a length of a turn-on period of the control signal supplied in the sensing period SP may be longer than that of the control signal supplied in the display period DP. In addition, in the sensing period SP, a portion of the turn-on period of the control signal supplied to the control line CLi may overlap with a turn-on period of the scan signal supplied to the scan line SLi.

In an embodiment, in the sensing period SP, the length of the turn-on period of the control signal may be longer than that of the scan signal. In an embodiment, in the sensing period SP, the control signal supplied to the control line CLi may start being simultaneously supplied with the scan signal supplied to the scan line SLi, and the control signal may be supplied longer than the scan signal, for example.

When the scan signal and the control signal are simultaneously supplied, the second and third transistors T2 and T3 may be turned on. Here, the first switch SWT1 may be in a turn-on state. When the second transistor T2 is turned on, a sensing data signal SGV (or sensing data voltage) for sensing may be supplied to the first node N1. At the same time, the reference voltage Vint may be supplied to the second node N2 by turn-on of the third transistor T3. Accordingly, a voltage corresponding to a voltage difference between the sensing data signal SGV and the reference voltage Vint may be stored in the storage capacitor Cst.

Subsequently, when the supply of the scan signal is suspended, the second transistor T2 may be turned off. When the second transistor T2 is turned off, the first node N1 is floated. Accordingly, the voltage of the second node N2 is increased, and a sensing current IS occurs through the first transistor T1. While the voltage increase is made, the sensing current IS may flow in the sensing line SSLj, and a sensing capacitor Cse may be charged. A speed of the voltage increase may be changed according to current ability of the first transistor T1, i.e., mobility.

After the voltage increase is made for a predetermined time, the second switch SWT2 may be turned on, so that the sensing line SSLj and the sensing driver 400 are connected to each other. In an embodiment, the analog-digital converter included in the sensing driver 400 may generate a digital code, based on a voltage (i.e., corresponding to the sensing current IS) charged in the sensing capacitor Cse, for example.

The sensing period SP may progress for every predetermined time while the display device 1000 is actually used. In an embodiment, the sensing period SP may be performed at a portion of a time for which the display device 1000 is turned on and/or a time for which the display device 1000 is turned off.

However, this is merely illustrative, and the sensing period SP may be inserted between predetermined display periods DP. Thus, the pixel unit 100 may continuously display an image having a uniform image quality.

In an embodiment, in the sensing period SP, pixel sensing may be performed on only some of the pixels PX of the entire pixel unit 100. In an embodiment, pixel sensing on a first pixel group may be performed in a first sensing period (e.g., a previous sensing period), and pixel sensing on a second pixel group may be performed in a second sensing period (e.g., a current sensing period), for example. The first pixel group and the second pixel group may include different pixels.

Figure 4:
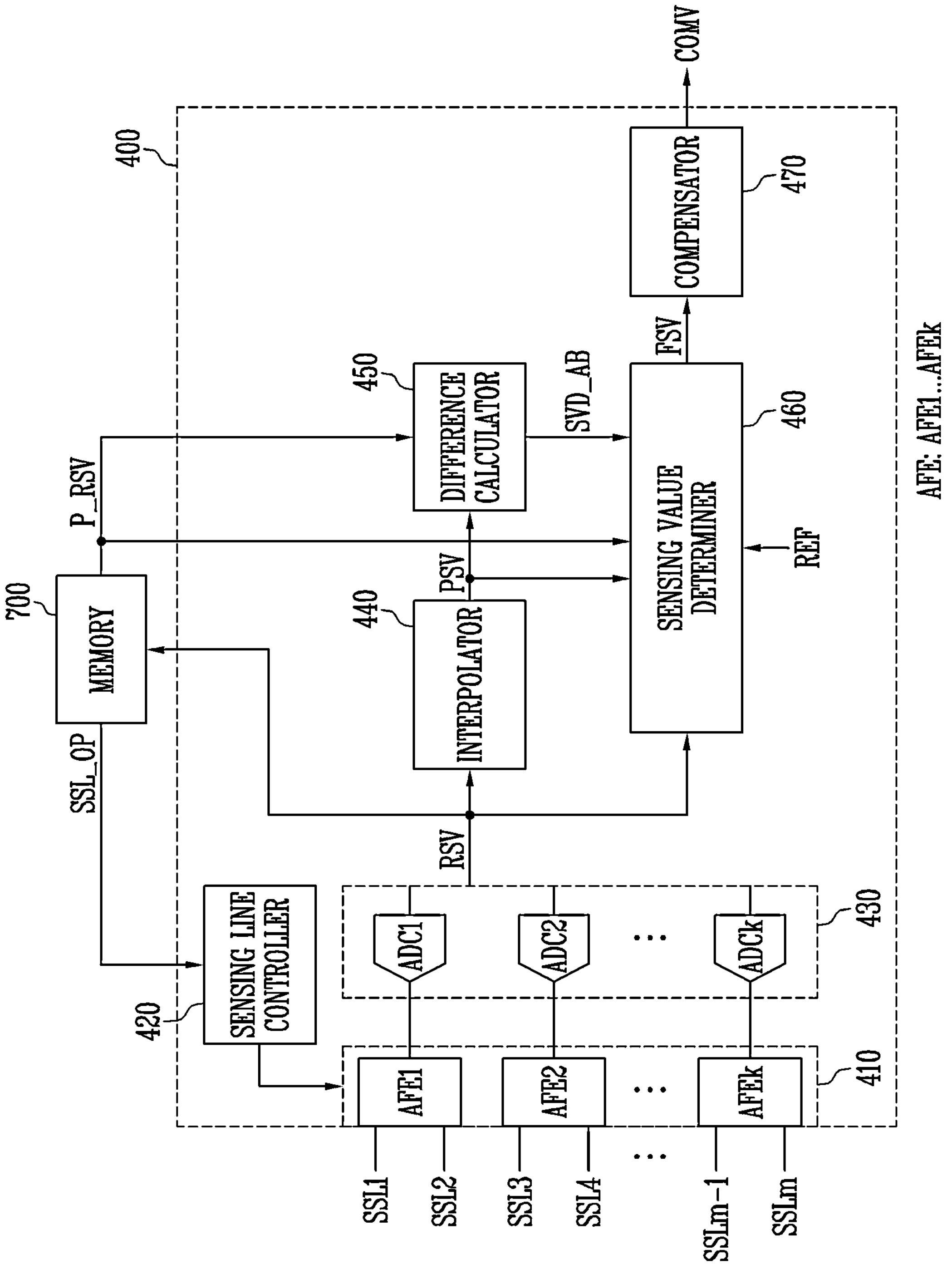
FIG. 4 is a block diagram illustrating an embodiment of a sensing driver included in the display device shown in FIG. 1.
Figure 5A:
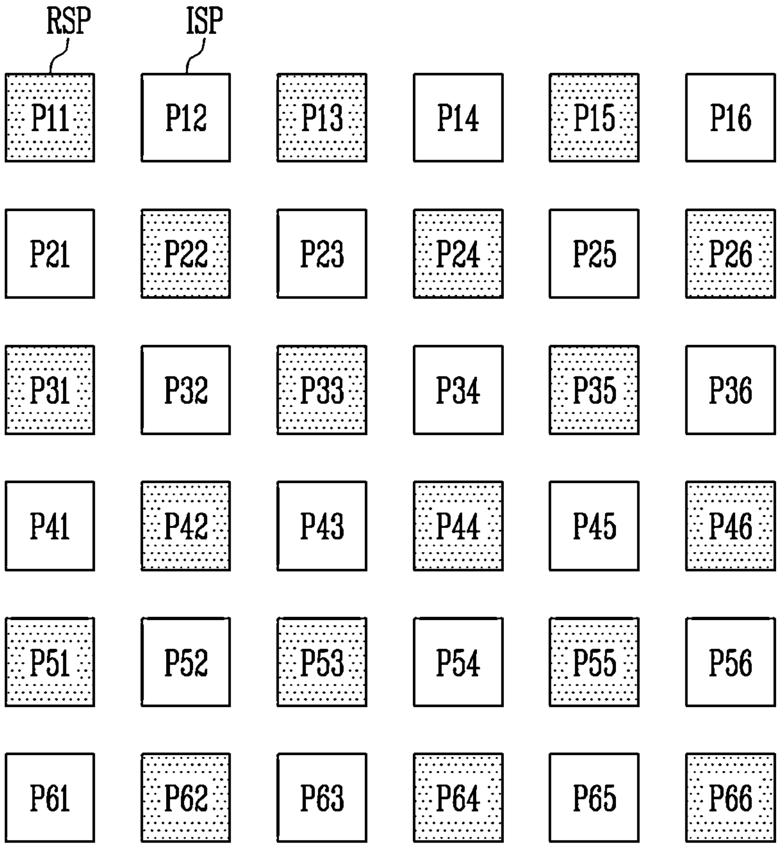
FIG. 5A is a diagram illustrating an embodiment of pixels sensed in a first sensing period.
Figure 5B:
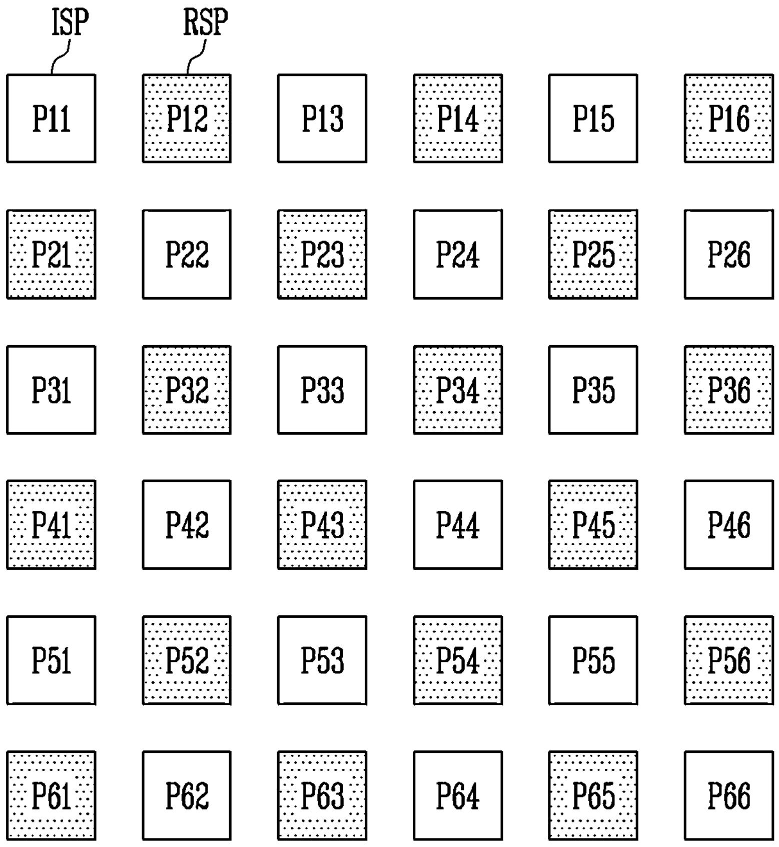
FIG. 5B is a diagram illustrating an embodiment of pixels sensed in a second sensing period.

FIG. 4 is a block diagram illustrating an embodiment of the sensing driver included in the display device shown in FIG. 1. FIG. 5A is a diagram illustrating an embodiment of pixels sensed in a first sensing period. FIG. 5B is a diagram illustrating an embodiment of pixels sensed in a second sensing period.

Referring to FIGS. 1, 4, 5A, and 5B, the sensing driver 400 may include an analog front end block 410, a sensing line controller 420, an analog-digital converter block 430, an interpolator 440, a difference calculator 450, a sensing value determiner 460, and a compensator 470.

The sensing driver 400 may sense characteristics of driving transistors of different pixels in each of adjacent sensing periods.

The analog front end block 410 may include first to k-th (k is a natural number smaller than m) analog front ends AFE1 to AFEk. The analog front end block 410 may be connected to the sensing lines SSL1 to SSLm. The analog front end block 410 may provide the analog-digital converter block 430 with sensing signals provided from the sensing lines SSL1 to SSLm or voltages obtained by sampling the sensing signals.

Each of the first to k-th analog front ends AFE1 to AFEk may be associated with at least two sensing lines of the sensing lines SSL1 to SSLm. That is, at least two sensing lines of the sensing lines SSL1 to SSLm may share one of the first to k-th analog front ends AFE1 to AFEk.

In an embodiment, the first and second sensing lines SSL1 and SSL2 may share the first analog front end AFE1, and third and fourth sensing lines SSL3 and SSL4 may share the second analog front end AFE2, for example. In an embodiment, (m−1)-th and m-th sensing lines SSLm−1 and SSLm may share the k-th analog front end AFEk, for example. Accordingly, the number of the analog front ends AFE1 to AFEk may be decreased to correspond to a half of the number of the sensing lines SSL1 to SSLm. That is, the sensing lines SSL1 to SSLm and the analog front ends AFE1 to AFEk may be connected to each other at a ratio of 2:1. Accordingly, a half of all the pixels may be sensed, and a sensing time may be decreased.

However, this is merely illustrative, and the connection ratio of the sensing lines SSL1 to SSLm and the analog front ends AFE1 to AFEk is not limited thereto. In an embodiment, the connection ratio of the sensing lines SSL1 to SSLm and the analog front ends AFE1 to AFEk may be extended as a ratio of 3:1, 4:1, or the like, for example.

Each of the analog front ends AFE1 to AFEk may be connected to one sensing line once under the control of the sensing line controller 420. In an embodiment, the first analog front end AFE1 may be selectively connected to the first sensing line SSL1 or the second sensing line SSL2, for example. The second analog front end AFE2 may be selectively connected to the third sensing line SSL3 or the fourth sensing line SSL4. The k-th analog front end AFEk may be selectively connected to the (m−1)-th sensing line SSLm−1 or the m-th sensing line SSLm.

Each of the analog front ends AFE1 to AFEk may include a plurality of switches. In an embodiment, each of the analog front ends AFE1 to AFEk may further include a capacitor for generating sampling voltages with respect to a sensing signal. Also, in order to process the sensing signal, each of the analog front ends AFE1 to AFEk may further include at least one of a charge amplifier, a low pass filter, a band pass filter, and a chopper, when necessary.

The sensing line controller 420 may control a connection between the sensing lines SSL1 to SSLm and the analog front ends AFE1 to AFEk. In an embodiment, the sensing line controller 420 may generate control signals for controlling the switches of the analog front ends AFE1 to AFEk, for example.

In an embodiment, the sensing driver 400 may sense a first pixel group PG1 in a first sensing period (or previous sensing period), and sense a second pixel group PG2 in a second sensing period (or current sensing period). In an embodiment, the first pixel group PG1 and the second pixel group PG2, which are shown in FIGS. 5A and 5B, may be pixels of the entire pixel unit 100, for example. The pixel unit 100 may be driven by being divided into the first pixel group PG1 and the second pixel group PG2.

As shown in FIG. 5A, pixels P11, P13, P15, P22, P24, P26, P31, P33, P35, P42, P44, P46, P51, P53, P55, P62, P64, and P66 included in the first pixel group PG1 may be real sensing pixels RSP in the first sensing period. The real sensing pixels RSP may be pixels which are electrically connected to the sensing driver 400 at a corresponding timing to provide a sensing signal to the sensing driver 400.

In an embodiment, when the sensing lines SSL1 to SSLm and the analog front ends AFE1 to AFEk are connected to each other at a ratio of 2:1, the first pixel group PG1 and the second pixel group PG2 may respectively include different halves among all the pixels, for example. Accordingly, a pixel sensing time may be reduced.

In an embodiment, pixels P11, P21, P31, P41, P51, and P61 may be connected to the first sensing line SSL1, and pixels P12, P22, P32, P42, P52, and P62 may be connected to the second sensing line SSL2. The first and second sensing lines SSL1 and SSL2 may share the first analog front end AFE1, and sensing signals may be supplied to the sensing driver 400 through the first analog front end AFE1 in an order of P11→P22→P31→P42→P51→P62 in the first sensing period. Therefore, in the first sensing period, the first sensing line SSL1 and the second sensing line SSL2 may be alternately connected to the first analog front end AFE1 in an order of the first sensing line SSL1 the second sensing line SSL2 (e.g., an odd number an even number). The sensing line controller 420 provides a control signal to the first analog front end AFE1, thereby control a sensing operation in the first sensing period.

As shown in FIG. 5B, pixels P12, P14, P16, P21, P23, P25, P32, P34, P36, P41, P43, P45, P52, P54, P56, P61, P63, and P65 included in the second pixel group PG2 may be real sensing pixels RSP in the second sensing period.

Sensing signals may be supplied to the sensing driver 400 through the first analog front end AFE1 in an order of P12→P21→P32→P41→P52→P61 in the second sensing period. Therefore, in the second sensing period, the second sensing line SSL2 and the first sensing line SSL1 may alternately connected to the first analog front end AFE1 in an order of the second sensing line SSL2→the first sensing line SSL1 (e.g., an even number→an odd number). The sensing line controller 420 provides a control signal to the first analog front end AFE1, thereby controlling a sensing operation in the second sensing period.

The second to k-th analog front ends AFE2 to AFEk may also be selectively connected respectively to corresponding sensing lines SSL3 to SSLm in a similar manner as described above.

As described above, connection timings between the sensing lines SSL1 to SSLm and the analog front ends AFE1 to AFEk in the first sensing period and the second sensing period may be controlled by the sensing line controller 420.

In an embodiment, the sensing line controller 420 may control sensing lines SSL1 to SSLm selected in the second sensing period, based on sensing line option information SSL_OP. The sensing line option information SSL_OP may correspond to pattern information of pixels selected in the first sensing period. In an embodiment, when the first pixel group PG1 is selected in the first sensing period, sensing line option information SSL_OP corresponding to the first pixel group PG1 may be updated, for example.

When the first pixel group PG1 is sensed in the first sensing period, the second pixel group PG2 is to be sensed in the second sensing period. The sensing line controller 420 may control the switches included in the analog front ends AFE1 to AFEk, based on the updated sensing line option information SSL_OP.

In an embodiment, the sensing line option information SSL_OP may be updated in the memory 700 for every sensing period. The sensing line controller 420 may read sensing line option information SSL_OP updated (stored) in the first sensing period from the memory 700, and control a connection between the sensing lines SSL1 to SSLm and the analog front ends AFE1 to AFEk, based on the read sensing line option information SSL_OP.

The analog-digital converter block 430 may include first to k-th analog-digital converters ADC1 to ADCk. In an embodiment, the first to k-th analog-digital converters ADC1 to ADCk may be respectively connected to the first to k-th analog front ends AFE1 to AFEk in a one-to-one manner, for example.

Each of the first to k-th analog-digital converters ADC1 to ADCk may sense a voltage from a sensing signal (e.g., sampling signal, or processed signal) provided from the first to k-th analog front ends AFE1 to AFEk, convert the sensed voltage value into a digital value (digital code), and output the digital value as a sensing value (e.g., real sensing value, or sensing data). In an embodiment, the sensing value may be expressed as a digital value of 12 bits, for example.

In the disclosure, for convenience of description, it is described that the analog front ends AFE1 to AFEk and the analog-digital converters ADC1 to ADCk are components separate from each other. However, it may be understood that configurations in which the analog front ends AFE1 to AFEk and the analog-digital converters ADC1 to ADCk are integrated are analog front ends, respectively.

In an embodiment, real sensing values RSV output from the first to k-th analog-digital converters ADC1 to ADCk may be stored in the memory 700. In an embodiment, in the first sensing period, real sensing values RSV corresponding to position information of the first pixel group PG1 may be stored in the memory 700. In the second sensing period, real sensing value RSV corresponding to position information of the second pixel group PG2 may be stored in the memory 700, for example.

Also, the read real sensing values RSV may be provided to the interpolator 440 and the sensing value determiner 460.

The interpolator 440 may calculate preliminary sensing values PSV of pixels which are not sensed in a corresponding sensing period by interpolating the real sensing values RSV. The interpolator 440 may be implemented in a hardware manner, including logic elements, or be implemented in a software manner in the sensing driver 400.

Pixels on which real pixel sensing is not performed may be expressed as interpolation sensing pixels ISP. In an embodiment, as shown in FIG. 5A, the pixels P12, P14, P16, P21, P23, P25, P32, P34, P36, P41, P43, P45, P52, P54, P56, P61, P63, and P65 of the second pixel group PG2 may be interpolation sensing pixels ISP in the first sensing period, for example. Similarly, as shown in FIG. 5B, the pixels P11, P13, P15, P22, P24, P26, P31, P33, P35, P42, P44, P46, P51, P53, P55, P62, P64, and P66 of the first pixel group PG1 may be interpolation sensing pixels ISP in the second sensing period.

Each of the preliminary sensing values PSV may be calculated by interpolation of real sensing values RSV of real sensing pixels RSP adjacent to each of the interpolation sensing pixels ISP. In an embodiment, in FIG. 5B, a preliminary sensing value PSV (e.g., an interpolation sensing value) of a first-row first-column pixel P11 may be calculated by interpolation of a real sensing value RSV of a first-row second-column pixel P12 and a real sensing value RSV of a second-row first-column pixel P21, for example. A preliminary sensing value PSV of a first-row third-column pixel P13 may be calculated by interpolation of the real sensing value RSV of the first-row second-column pixel P12, a real sensing value RSV of a first-row fourth-column pixel P14, and a real sensing value RSV of a second-row third-column pixel P23. A preliminary sensing value PSV of a second-row second-column pixel P22 may be calculated by interpolation of the real sensing value RSV of the first-row second-column pixel P12, the real sensing value RSV of the second-row first-column pixel P21, the real sensing value RSV of the second-row third-column pixel P23, and a real sensing value RSV of a third-row second-column pixel P32.

However, this is merely illustrative, and the method of calculating the preliminary sensing values PSV of the interpolation sensing pixels ISP is not limited thereto.

When a compensation value COMV is determined by reflecting a preliminary sensing value PSV calculated by interpolation to data compensation as it is in the second sensing period, real degradation or characteristic changes with respect to the interpolation sensing pixels ISP may not be accurately reflected due to an interpolation error.

In an embodiment, a real sensing value sensed in the first-row second-column pixel P12 in the first sensing period and an interpolation sensing value (preliminary sensing value) of the first-row second-column pixel P12, which is calculated by interpolation in the second sensing period, may be different from each other, for example. That is, the interpolation sensing value is influenced by adjacent real sensing values RSV, and therefore, an interpolation error (which means a difference between a real sensing value RSV and an interpolation sensing value of a target pixel) may occur.

In particular, pixels at a boundary (outline) portion of a logo image displayed at the same position for a long time may have a large degradation deviation. When a sensing value based on interpolation of adjacent real sensing values RSV is calculated without actual sensing with respect to a predetermined target pixel, a difference between a real sensing value RSV and an interpolation sensing value of the target pixel may become large, and an interpolation error may be increased. Accordingly, the compensation reliability of image data about degradation of the target pixel, etc., may be deteriorated.

The sensing driver 400 in the embodiments of the invention may determine a final sensing value FSV in the second sensing period with respect to each of the interpolation sensing pixels ISP in the second sensing period, based on a difference between the real sensing value acquired in the first sensing period and the preliminary sensing value acquired in the second sensing period.

Hereinafter, in FIG. 4, an operation in the second sensing period will be mainly described.

In an embodiment, the difference calculator 450 may calculate a sensing value difference SVD_AB as a difference between a previous sensing value (e.g., a previous real sensing value P_RSV) of a pixel which is not sensed in the second sensing period (e.g., an interpolation sensing pixel ISP) and a preliminary sensing value PSV of the corresponding pixel. The sensing value difference SVD_AB may have an absolute value form. In an embodiment, the absolute value of a difference between a previous real sensing value P_RSV and a preliminary sensing value PSV of the first-row first-column pixel P11 may be determined as a sensing value difference SVD_AB of the first-row first-column pixel P11, for example.

In an embodiment, the difference calculator 450 may read a previous real sensing value P_RSV from the memory 700.

The difference calculator 450 may be implemented as hardware having various configurations known in the art, which includes logic elements for calculating a difference between digital values, or be implemented as software in the sensing driver 400.

The difference calculator 450 may calculate a sensing value difference SVD_AB of each of the interpolation sensing pixels ISP in the second sensing period. In an embodiment, sensing value differences SVD_AB of the pixels of the first pixel group PG1 shown in FIG. 5B may be calculated, for example. The sensing value difference SVD_AB may be provided to the sensing value determiner 460.

In an embodiment, real sensing values RSV of the second pixel group PG2, which are actually sensed in the second sensing period, may be provided to the sensing value determiner 460 without passing through the difference calculator 450.

The sensing value determiner 460 may determine a final sensing value FSV of a target pixel by comparing the sensing value difference SVD_AB with a predetermined reference value REF. In an embodiment, the sensing value determiner 460 may select, as the final sensing value FSV, one of a previous real sensing value P_RSV and a preliminary sensing value PSV of the target pixel.

The sensing value determiner 460 may include a comparison circuit which compares the sensing value difference SVD_AB with the reference value REF and a selection circuit which selects the final sensing value FSV, based on the comparison result. However, this is merely illustrative, and the sensing value determiner 460 or the comparison circuit and the selection circuit, which are included therein, may implemented in a hardware manner, including logic elements, or be implemented in a software manner in the sensing driver 400.

In an embodiment, when the sensing value difference SVD_AB is greater than the reference value REF, the sensing value determiner 460 may determine a previous sensing value (e.g., the previous real sensing value P_RSV) of the target pixel as the final sensing value FSV of the target pixel. That is, a case when the difference between the preliminary sensing value PSV calculated by interpolation and the previous real sensing value P_RSV is greater than the reference value REF may be determined as an interpolation error. Therefore, the preliminary sensing value PSV of the target pixel may be discarded, and the previous real sensing value P_RSV may be determined as the final sensing value FSV of the target pixel.

In an embodiment, when the sensing value difference SVD_AB is equal to or smaller than the reference value REF, the sensing value determiner 460 may determine the preliminary sensing value PSV of the target pixel as the final sensing value FSV of the target pixel. A result calculated by the interpolator 440 may be determined as the final sensing value FSV of the target pixel.

In an embodiment, the real sensing values RSV provided from the analog-digital converter block 430 may all be output as final sensing values FSV as they are.

The final sensing value FSV may be provided to the compensator 470. The compensator 470 may calculate a mobility characteristic and/or a threshold voltage characteristic of the first transistor T1 of each of the pixels PX, based on the final sensing values FSV. The compensator 470 may determine a compensation value COMV of input image data IDATA, based on the mobility characteristic and/or the threshold voltage characteristic.

In an embodiment, the compensation value COMV may be a value for adjusting a data signal (i.e., a voltage supplied to the gate electrode of the first transistor T1) corresponding to a predetermined grayscale, for example. In an embodiment, compensated image data CDATA may be generated by applying the compensation value COMV to the input image data IDATA.

The compensator 470 may implemented in a hardware manner, including logic elements, or be implemented in a software manner in the sensing driver 400.

As described above, the display device 1000 in the embodiments of the invention may include a structure in which a plurality of sensing lines shares each of the analog front ends AFE1 to AFEk of the sensing driver 400. Accordingly, only some of all the pixels are actually sensed in the sensing period, and a sensing value of pixels which are not sensed is calculated through interpolation, so that a pixel sensing time for external compensation may be decreased.

Further, a final sensing value FSV of a target pixel which is not currently actually sensed is determined according to a difference between an interpolated sensing value (e.g., a preliminary sensing value PSV) and a previous real sensing value P_RSV of the target pixel, so that occurrence of an interpolation error may be reduced while decreasing a sensing time. Thus, sensing reliability and image quality may be improved.

Figure 6:
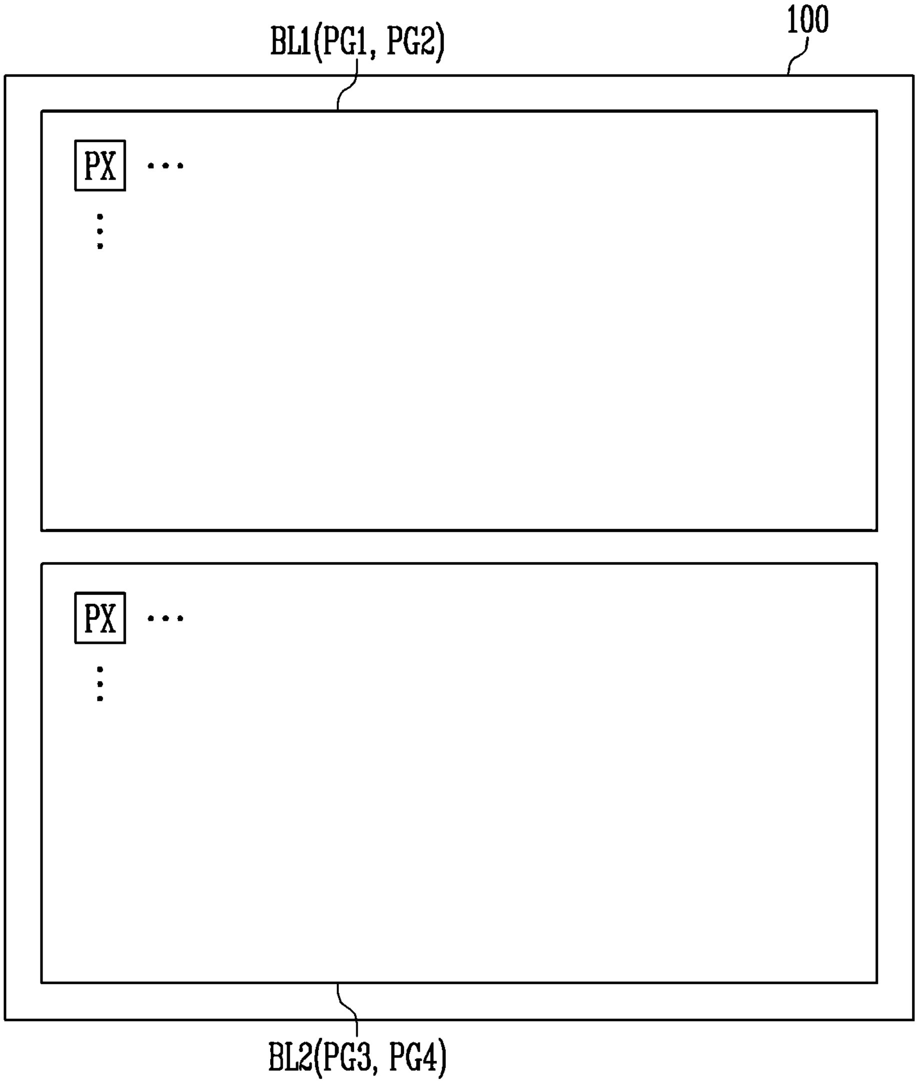
FIG. 6 is a diagram illustrating an embodiment of a pixel unit including the pixels shown in FIGS. 5A and 5B.

FIG. 6 is a diagram illustrating an embodiment of the pixel unit including the pixels shown in FIGS. 5A and 5B.

Referring to FIGS. 1, 5A, 5B, and 6, the pixel unit 100 may include a plurality of pixel blocks BL1 and BL2 each including pixels PX.

A first pixel block BL1 may be driven by being divided into a first pixel group PG1 and a second pixel group PG2. In an embodiment, the sensing driver 400 may sense the first pixel group PG1 in a first sensing period, and sense the second pixel group PG2 in a second sensing period, for example.

A second pixel block BL2 may be driven by being divided into a third pixel group PG3 and a fourth pixel group PG4. In an embodiment, the sensing driver 400 may sense the third pixel group PG3 in a third sensing period, and sense the fourth pixel group PG4 in a fourth sensing period, for example. In other words, a sensing time of the first pixel block BL1 and a sensing time of the second pixel block BL2 may be separated from each other.

The third pixel group PG3 and the fourth pixel group PG4 may include pixels driven as described with reference to FIGS. 5A and 5B. In an embodiment, pixels of the third pixel group PG3 and the fourth pixel group PG4 may be alternately disposed in row and column directions, for example.

In an alternative embodiment, the sensing driver 400 may sense the third pixel group PG3 in the first sensing period, and sense the fourth pixel group PG4 in the second sensing period.

However, this is merely illustrative, and the positions, number, and size of the pixel blocks and times at which the pixel blocks are respectively sensed are not limited thereto.

Figure 7:
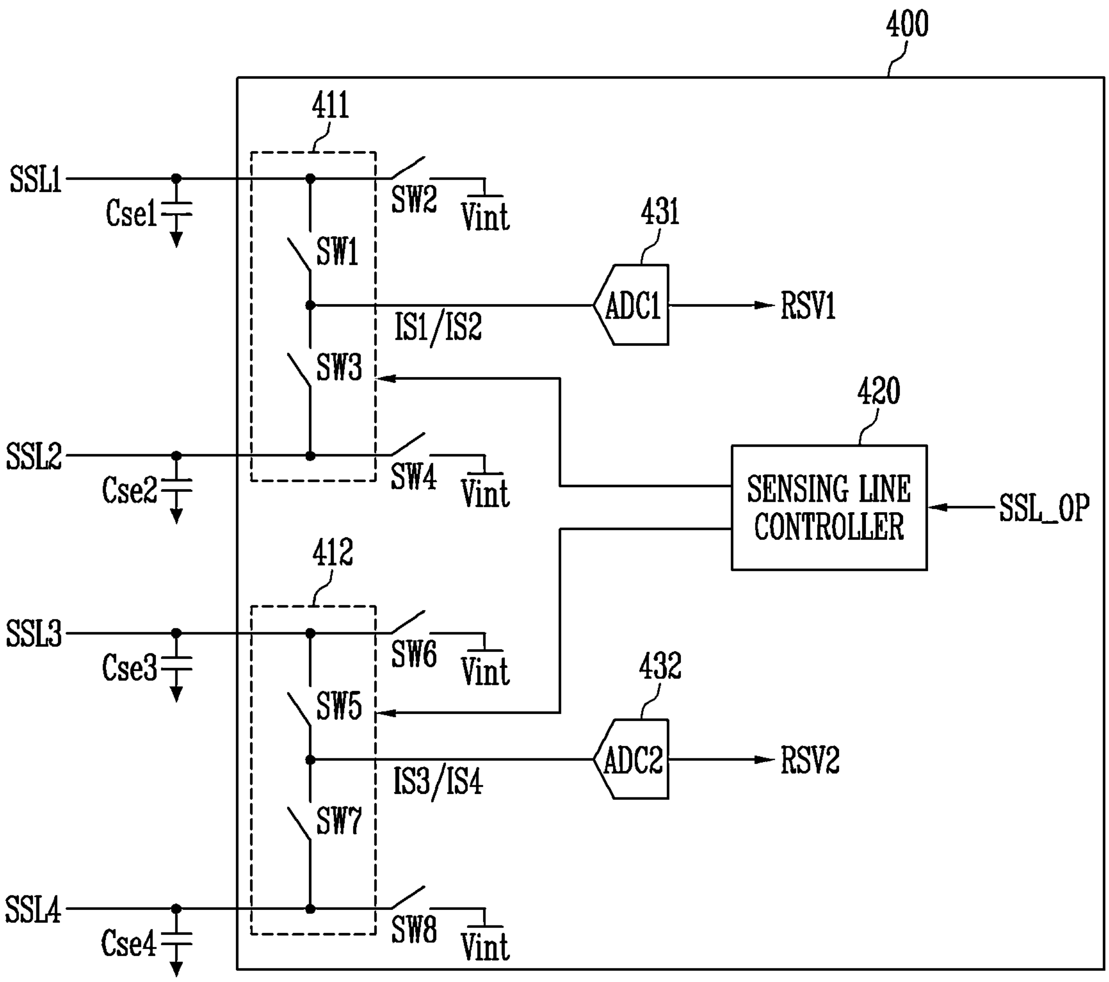
FIG. 7 is a diagram illustrating an embodiment of analog front ends included in the sensing driver shown in FIG. 4.

FIG. 7 is a diagram illustrating an embodiment of the analog front ends included in the sensing driver shown in FIG. 4.

Referring to FIGS. 4 and 7, two sensing lines may share one analog front end.

First to fourth sensing capacitors Cse1, Cse2, Cse3, and Cse4 may be respectively connected to the first to fourth sensing lines SSL1, SSL2, SSL3, and SSL4.

The first and second sensing lines SSL1 and SSL2 may share a first analog front end 411. In an embodiment, the first analog front end 411 may include a first switch SW1 and a third switch SW3.

When the first switch SW1 is turned on, the first sensing line SSL1 may be connected to the first analog front end 411, and a first sensing current IS1 may flow from the first sensing line SSL1. When the third switch SW3 is turned on, the second sensing lines SSL2 may be connected to the first analog front end 411, and a second sensing current IS2 may flow from the second sensing line SSL2.

The first and third switches SW1 and SW3 may be controlled by the sensing line controller 420. The sensing line controller 420 may control the first and third switches SW1 and SW3, based on the sensing line option information SSL_OP.

A sensing signal corresponding to the first sensing current IS1 or the second sensing current IS2 may be provided to a first analog-digital converter 431. The first analog-digital converter 431 may output a first real sensing value RSV1 obtained by digital-converting the sensing signal.

Similarly to this, the third and fourth sensing lines SSL3 and SSL4 may share a second analog front end 412. In an embodiment, the second analog front end 412 may include a fifth switch SW5 and a seventh switch SW7.

When the fifth switch SW5 is turned on, the third sensing line SSL3 may be connected to the second analog front end 412, and a third sensing current IS3 may flow from the third sensing line SSL3. When the seventh switch SW7 is turned on, the fourth sensing line SSL4 may be connected to the second analog front end 412, and a fourth sensing current IS4 may flow from the fourth sensing line SSL4.

A sensing signal corresponding to the third sensing current IS3 or the fourth sensing current IS4 may be provided to a second analog-digital converter 432. The second analog-digital converter 432 may output a second real sensing value RSV2 obtained by digital-converting the sensing signal.

The fifth and seventh switches SW5 and SW7 may be controlled by the sensing line controller 420.

Each of the first and second analog front ends 411 and 412 may further include at least one of a capacitor, a charge amplifier, a low pass filter, a band pass filter, and chopper, which process a sensing signal.

Although a case where a second switch SW2, a fourth switch SW4, a sixth switch SW6, and an eighth switch SW8 are included in the sensing driver 400 is illustrated in FIG. 7, the invention is not limited thereto, and the second switch SW2, the fourth switch SW4, the sixth switch SW6, and the eighth switch SW8 may be integrated in the display panel at the outside of the sensing driver 400. Also, the second switch SW2, the fourth switch SW4, the sixth switch SW6, and the eighth switch SW8 may perform a function substantially equal to that of the first switch SWT1 shown in FIG. 2.

Figure 8:
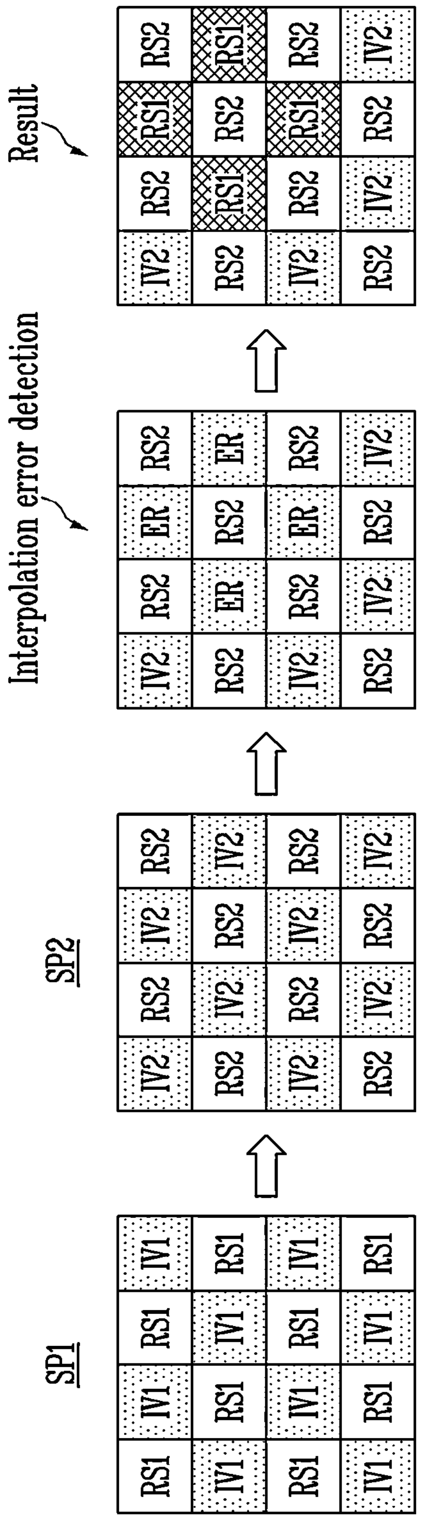
FIG. 8 is a diagram illustrating an embodiment of an operation of the display device shown in FIG. 1 and sensing values of pixels, which are determined by the operation.

FIG. 8 is a diagram illustrating an embodiment of an operation of the display device shown in FIG. 1 and sensing values of pixels, which are determined by the operation.

Referring to FIGS. 1, 4, 5A, 5B, and 8, sensing values corresponding to the second sensing period SP2 may be determined based on the sensing values calculated in the first sensing period SP1 and the second sensing period SP2.

FIG. 8 shows sensing values corresponding to pixels according to a predetermined operation period of the display device 1000.

The first sensing period SP1 may be a previous sensing period. First real sensing values RS1 may be detected with respect to the first pixel group PG1 in the first sensing period SP1. First interpolation values IV1 may be calculated in the second pixel group PG2.

The second sensing period SP2 may be a current sensing period. Second real sensing values RS2 may be detected with respect to the second pixel group PG2 in the second sensing period SP2. Second interpolation values IV2 may be calculated in the first pixel group PG1.

Subsequently, the difference calculator 450 may compare a sensing value difference SVD_AB as a difference between the second interpolation values IV2 and the first real sensing values RS1 with respect to the first pixel group PG1 with a reference value REF. Pixels for which the sensing value difference SVD_AB is greater than the reference value REF may be detected as error pixels ER.

Consequently, the second interpolation values IV2 may be reflected to pixels for which the sensing value difference SVD_AB is equal to or smaller than the reference value REF as they are. The first real sensing values RS1 detected in the first sensing period SP1 may be reflected to the error pixel ER. In addition, the second real sensing values RS2 may be reflected to the second pixel group PG2 as they are. Therefore, a sensing error of pixels may be decreased, so that sensing reliability may be improved.

In an embodiment, address information of the error pixel ER may be stored in the memory 700. The sensing driver 400 may refer to the address information of the error pixel ER when a final sensing value FSV is determined. In an embodiment, a real sensing value RSV or a previous real sensing value P_RSV of a corresponding address (coordinate) may be applied to the error pixel ER regardless of the magnitude of the sensing value difference SVD_AB, for example. Thus, pixel sensing performance may be further improved.

Figure 9:
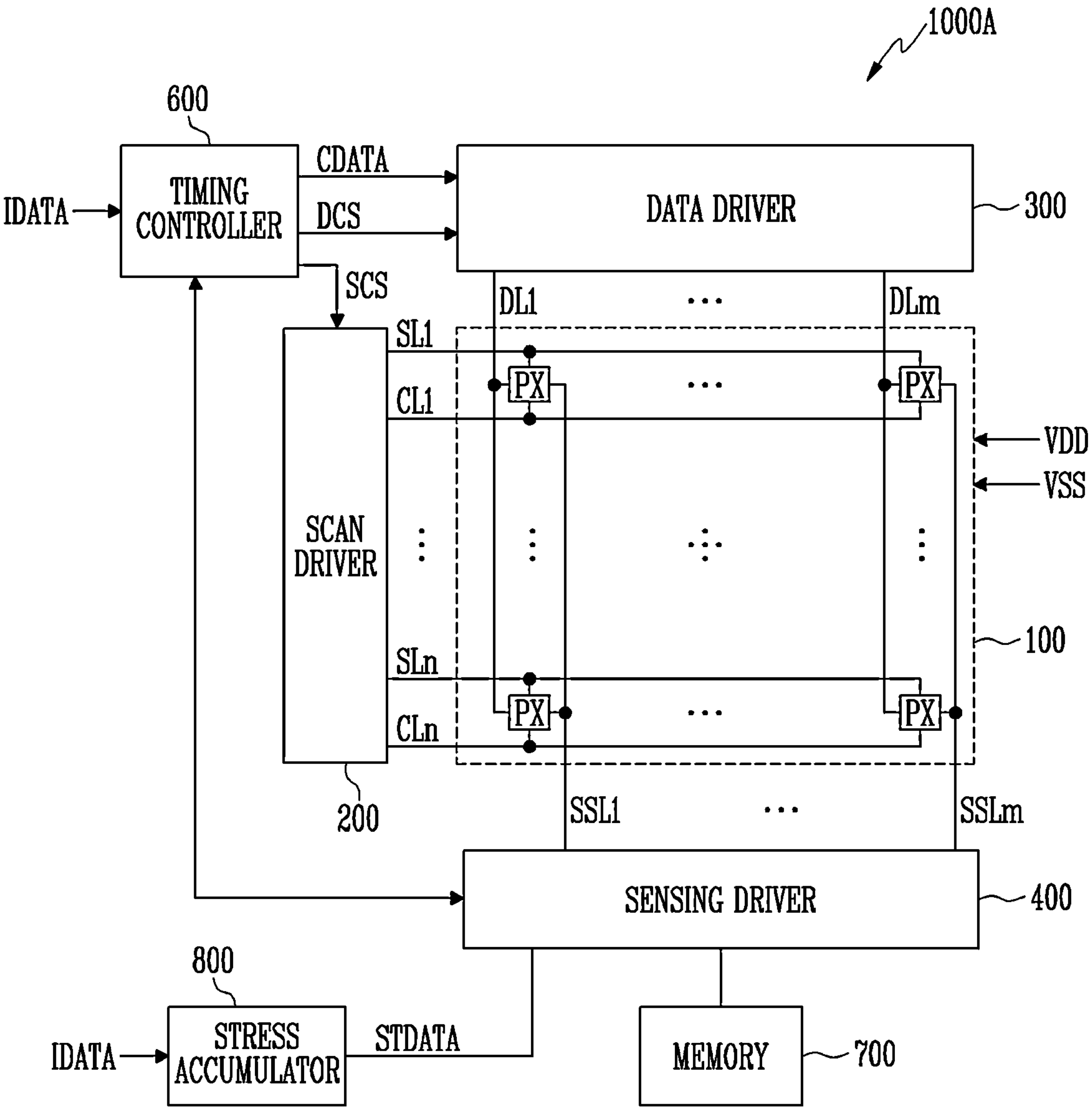
FIG. 9 is a block diagram illustrating another embodiment of the display device shown in FIG. 1.

FIG. 9 is a block diagram illustrating an embodiment of the display device shown in FIG. 1.

In FIG. 9, components identical or similar to those shown in FIG. 1 are designated by like reference numerals, and overlapping descriptions will be omitted.

Referring to FIG. 9, a display device 1000A may include a pixel unit 100, a scan driver 200, a data driver 300, a sensing driver 400, a timing controller 600, a memory 700, and a stress accumulator 800.

In an embodiment, the stress accumulator 800 may accumulate stress data STDATA of each of pixels PX, based on image data (e.g., input image data IDATA). In an embodiment, the stress data STDATA may correspond to a grayscale accumulation value for each pixel PX, for example.

Although a case where the input image data IDATA is provided to the stress accumulator 800 is illustrated in FIG. 9, the invention is not limited thereto. In an embodiment, the stress accumulator 800 may accumulate the stress data STDATA, based on compensated image data CDATA, for example.

The stress data STDATA may be provided to the sensing driver 400. The sensing driver 400 may perform image data compensation, based on the stress data STDATA.

Figure 10:
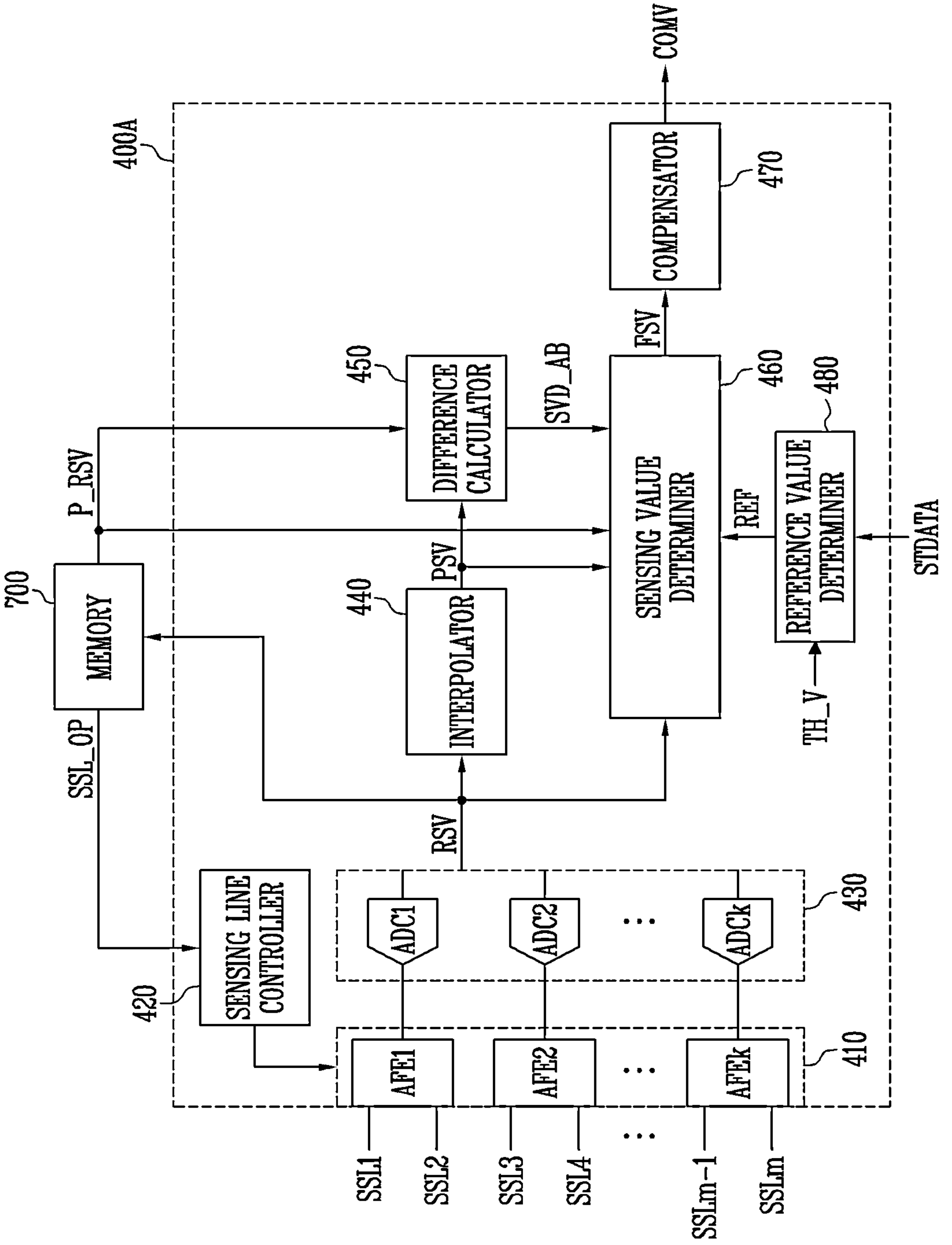
FIG. 10 is a block diagram illustrating an embodiment of a sensing driver included in the display device shown in FIG. 9.

FIG. 10 is a block diagram illustrating an embodiment of the sensing driver included in the display device shown in FIG. 9.

In FIG. 10, components identical or similar to those shown in FIG. 4 are designated by like reference numerals, and overlapping descriptions will be omitted.

Referring to FIGS. 9 and 10, a sensing driver 400A may include an analog front end block 410, a sensing line controller 420, an analog-digital converter block 430, an interpolator 440, a difference calculator 450, a sensing value determiner 460, a compensator 470, and a reference value determiner 480.

In an embodiment, the reference value determiner 480 may vary a reference value REF with respect to each of the pixels PX, based on stress data STDATA. In an embodiment, the reference value determiner 480 may compare the stress data STDATA with a predetermined threshold value TH_V, for example.

When an accumulation value of the stress data STDATA increases, degradation of the pixel PX and the driving transistor of the pixel may further increase. As the degradation of the driving transistor of the pixel progresses, compensation ability may be deteriorated, and a visibility defect caused by a compensation error (sensing error) may be relatively less recognized. Therefore, when stress data STDATA of a target pixel exceeds the threshold value TH_V, the reference value determiner 480 may increase a reference value REF used for the target pixel.

In an embodiment, when the stress data STDATA of the target pixel is equal to or smaller than the threshold value TH_V, the reference value determiner 480 may determine the reference value REF used for the target pixel as a first value, for example. When the stress data STDATA of the target pixel is greater than the threshold value TH_V, the reference value determiner 480 may determine the reference value REF used for the target pixel as a second value greater than the first value.

Therefore, when degradation of the target pixel progresses relatively largely, a relatively large reference value REF may be applied, and a probability that a preliminary sensing value PSV will be selected as a final sensing value FSV may increase.

Figure 11:
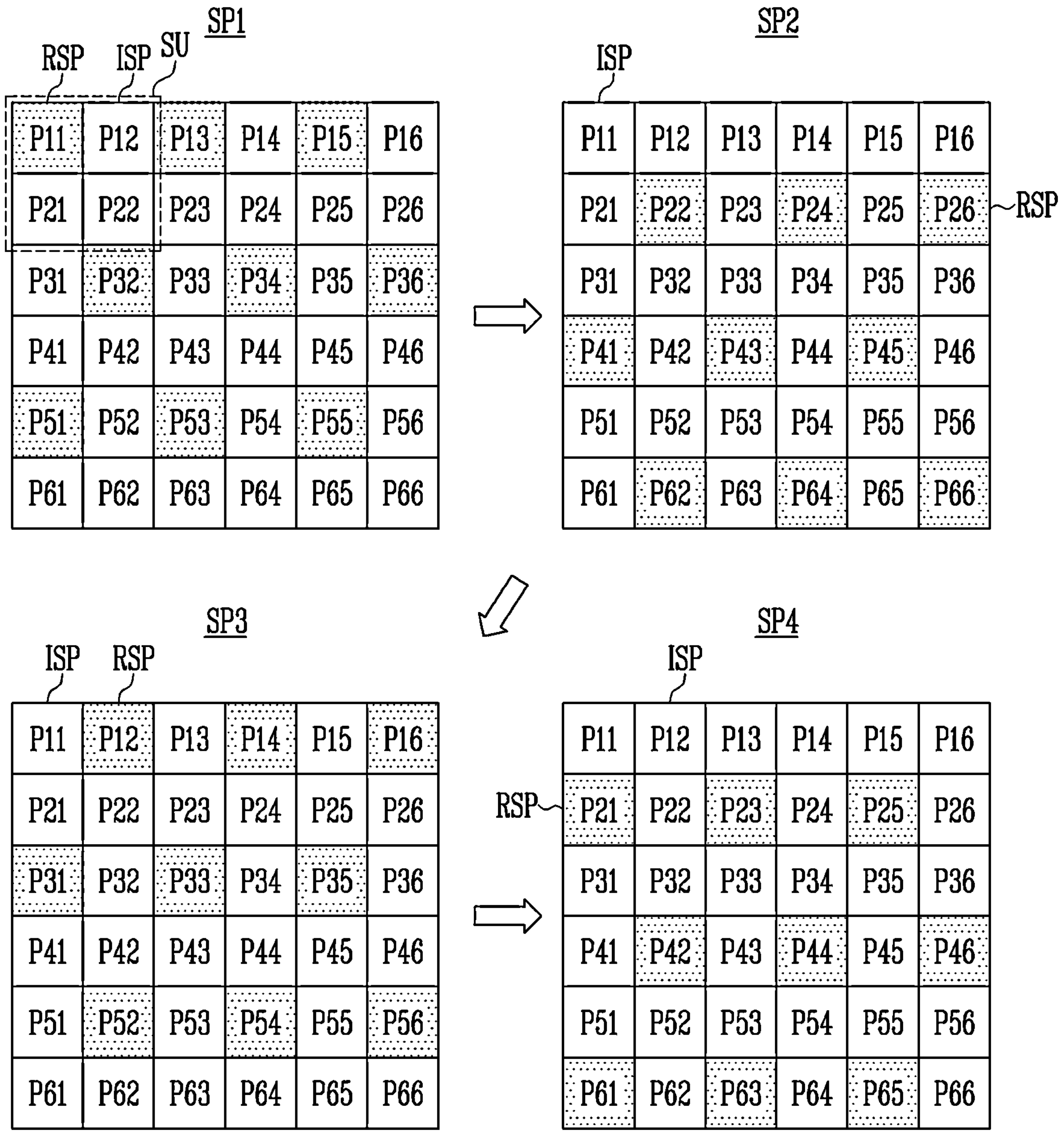
FIG. 11 is a diagram illustrating an embodiment of an operation of the display device shown in FIG. 1 and sensing values of pixels, which are determined by the operation.

FIG. 11 is a diagram illustrating an embodiment of an operation of the display device shown in FIG. 1 and sensing values of pixels, which are determined by the operation.

Referring to FIG. 11, different pixels may be sensed with respect to sensing periods SP1, SP2, SP3, and SP4 in a pixel unit of 2×2.

The pixel unit of 2×2 may be understood as a sensing unit SU. In a first sensing period SP1, pixels P11, P13, P15, P32, P34, P36, P51, P53, and P55 of a first pixel group may be sensed as real sensing pixels RSP. The other pixels may be interpolation sensing pixels ISP, and have interpolation sensing values through interpolation of actually sensed values.

In a second sensing period SP2, pixels P22, P24, P26, P41, P43, P45, P62, P64, and P66 of a second pixel group may be sensed as real sensing pixels RSP. The other pixels may be interpolation sensing pixels ISP, and have interpolation sensing values through interpolation of actually sensed values.

In a third sensing period SP3, pixels P12, P14, P16, P31, P33, P35, P52, P54, and P56 of a third pixel group may be sensed as real sensing pixels RSP. The other pixels may be interpolation sensing pixels ISP, and have interpolation sensing values through interpolation of actually sensed values.

In a fourth sensing period SP4, pixels P21, P23, P25, P42, P44, P46, P61, P63, and P65 of a third pixel group may be sensed as real sensing pixels RSP. The other pixels may be interpolation sensing pixels ISP, and have interpolation sensing values through interpolation of actually sensed values.

In each of the sensing periods SP1, SP2, SP3, and SP4, a sensing value with respect to a corresponding position may be determined based on a difference between an interpolation sensing value of each of the interpolation sensing pixels ISP and a previous real sensing value of the corresponding position. A final sensing value of each pixel may be determined in a manner similar to that of the operation described with reference to FIGS. 4 to 8.

The sensing time may be further shortened through the sensing operation shown in FIG. 11.

Figure 12:
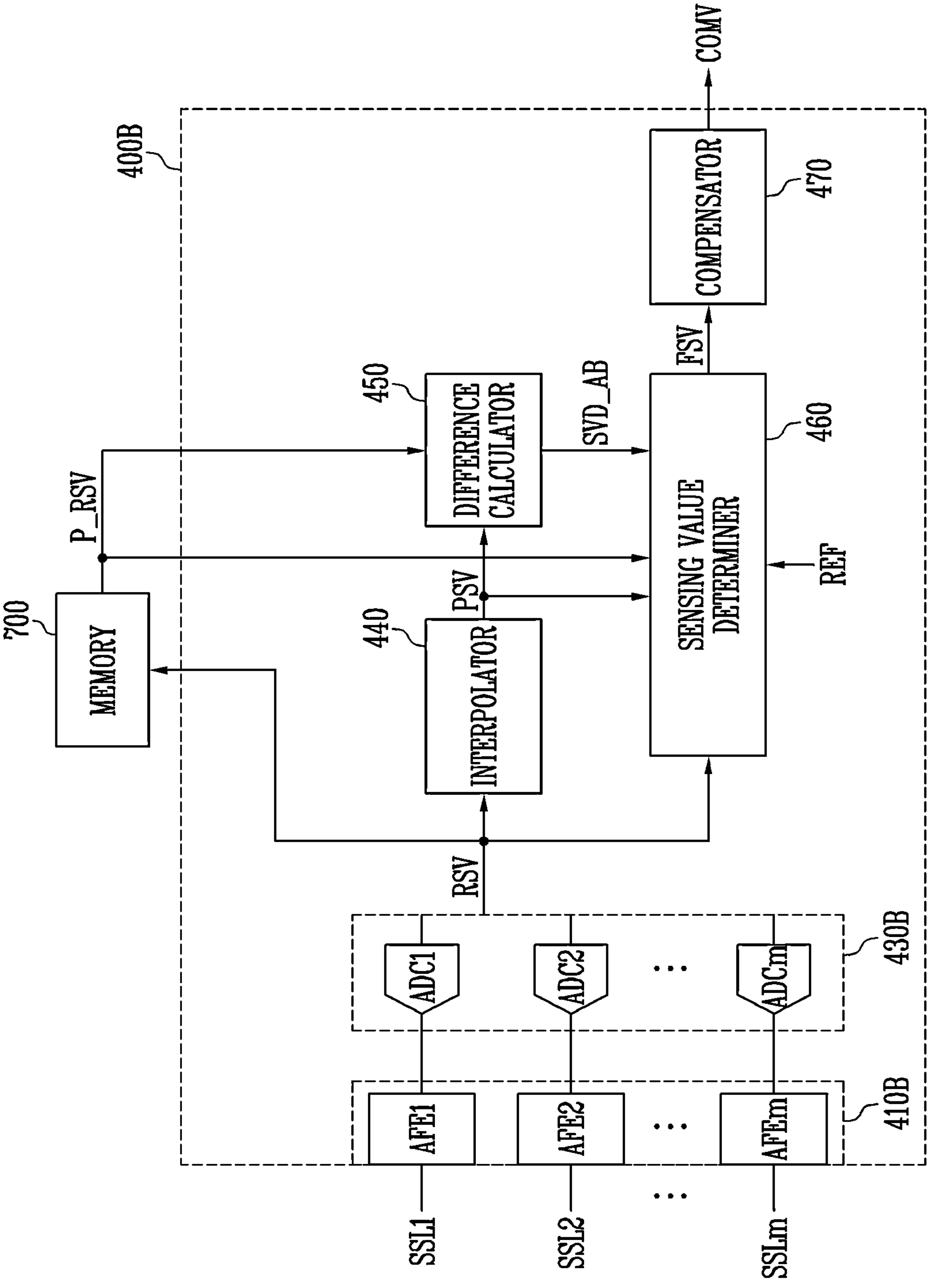
FIG. 12 is a block diagram illustrating an embodiment of the sensing driver included in the display device shown in FIG. 1.

FIG. 12 is a block diagram illustrating an embodiment of the sensing driver included in the display device shown in FIG. 1.

In FIG. 12, components identical or similar to those shown in FIG. 4 are designated by like reference numerals, and overlapping descriptions will be omitted.

Referring to FIG. 12, a sensing driver 400B may include an analog front end block 410B, an analog-digital converter block 430B, an interpolator 440, a difference calculator 450, a sensing value determiner 460, and a compensator 470.

In an embodiment, the sensing driver 400B may further include the reference value determiner described with reference to FIG. 10.

The analog front end block 410B may include first to m-th analog front ends AFE1 to AFEm. The analog front end block 410B may be connected to the sensing lines SSL1 to SSLm. The analog front end block 410B may provide the analog-digital converter block 430B with sensing signals provided from the sensing lines SSL1 to SSLm or voltages obtained by sampling the sensing signals.

First to m-th analog front ends AFE1 to AFEm may be respectively connected to the sensing lines SSL1 to SSLm in a one-to-one manner. In an embodiment, each of the first to m-th analog front ends AFEI to AFEm may have a single-ended circuit configuration, for example. Therefore, it is unnecessary to control a connection between the sensing lines and the analog front ends, and therefore, the sensing line controller 420 shown in FIG. 4 may be omitted.

Figure 13:
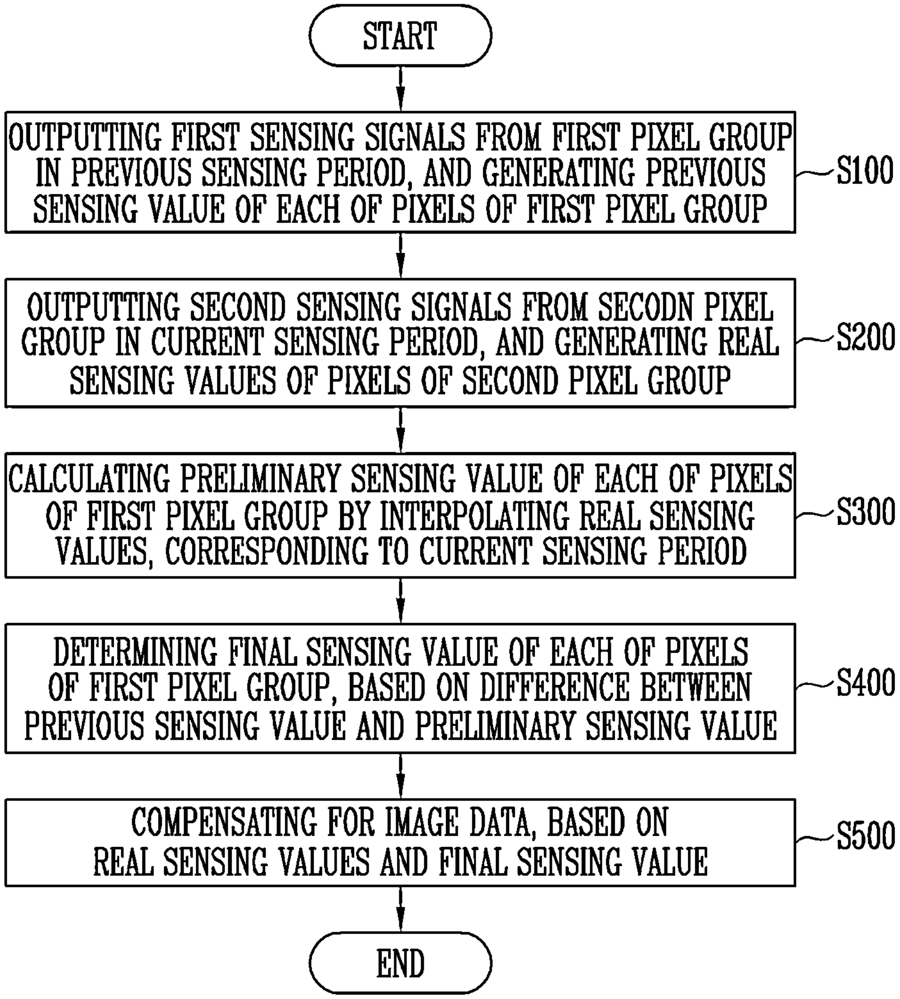
FIG. 13 is a flowchart illustrating a method of driving the display device in accordance with the invention.
Figure 14:
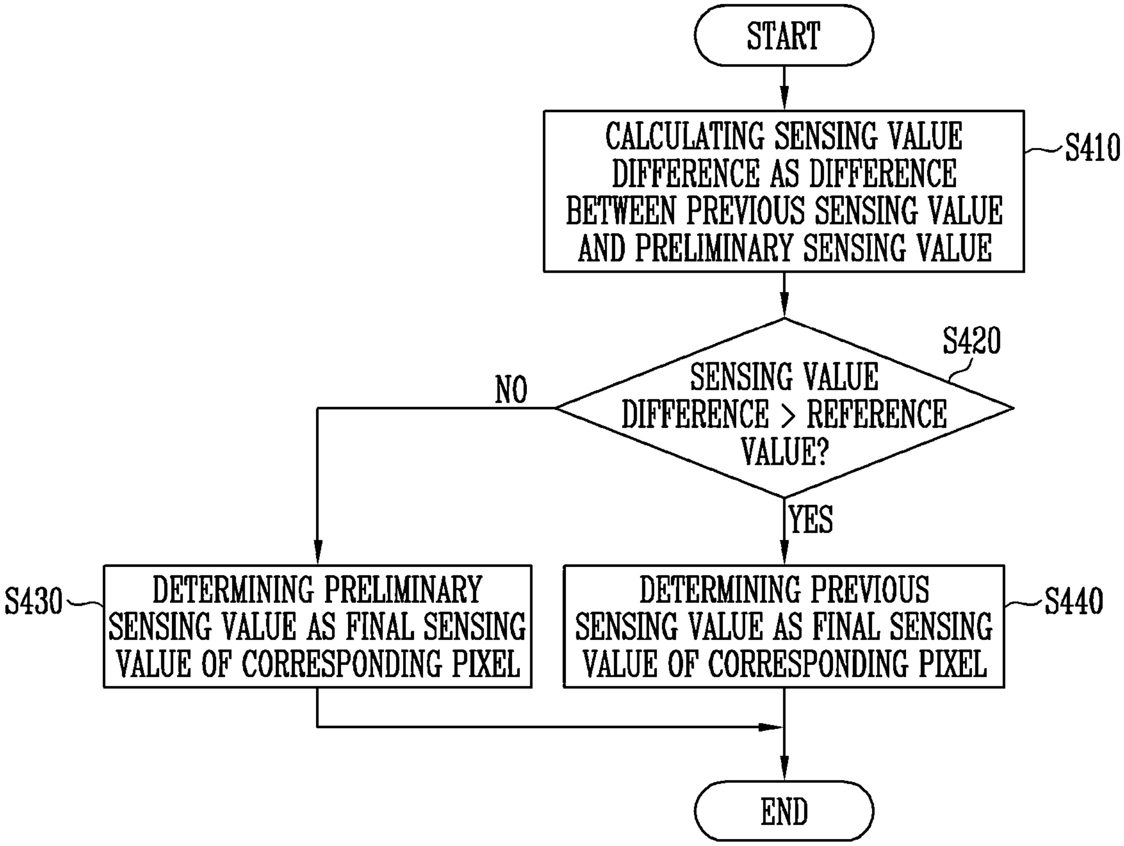
FIG. 14 is a flowchart illustrating an embodiment of the method shown in FIG. 13.

FIG. 13 is a flowchart illustrating a method of driving the display device in accordance with the invention. FIG. 14 is a flowchart illustrating an embodiment of the method shown in FIG. 13.

Referring to FIGS. 13 and 14, the method may include outputting first sensing signals from a first pixel group in a previous sensing period (e.g., a first sensing period), and generating a previous sensing value of each of pixels of a first pixel group, based on the first sensing signals (S100), and outputting second sensing signals from a second pixel group different from the first pixel group in a current sensing period (e.g., a second sensing period), and generating real sensing values of pixels of the second pixel group, based on the second sensing signals (S200).

Also, the method may include calculating a preliminary sensing value of each of the pixels of the first pixel group by interpolating the real sensing values, corresponding to the current sensing period (S300), and determining a final sensing value of each of the pixels of the first pixel group, based on a difference between the previous sensing value and the preliminary sensing value (S400).

In an embodiment, the final sensing value of each of the pixels of the first pixel group may be determined as one of the previous sensing value and the preliminary sensing value.

In an embodiment, as shown in FIG. 14, in the determining of the final sensing value, a sensing value difference as the difference between the previous sensing value and the preliminary sensing value may be calculated (S410), and the sensing value difference may be compared with a predetermined reference value (S420).

When the sensing value difference is equal to or smaller than the reference value, the preliminary sensing value may be determined as a final sensing value of a target pixel (S430).

When the sensing value difference is greater than the reference value, the previous sensing value may be determined as the final sensing value of the target pixel (S440).

Subsequently, image data may be compensated based on the real sensing values and the final sensing value (S500).

The method has been described in detail with reference to FIGS. 1 to 8, and therefore, overlapping descriptions will be omitted.

Figure 15:
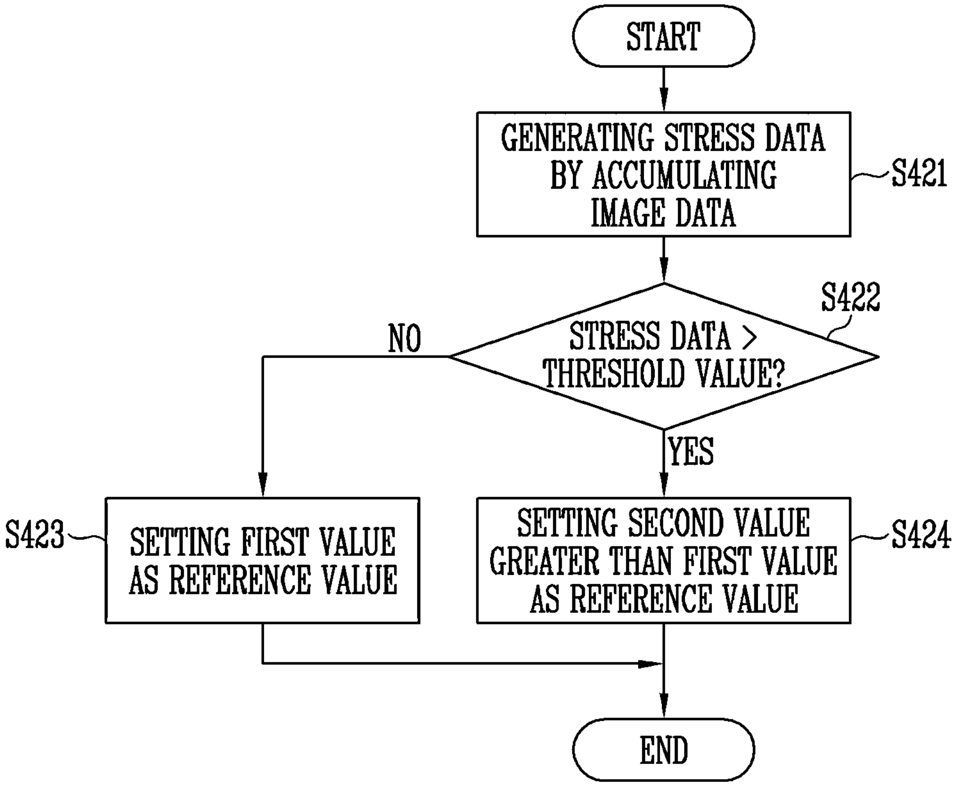
FIG. 15 is a flowchart illustrating an embodiment of the method shown in FIG. 14.

FIG. 15 is a flowchart illustrating an embodiment of the method shown in FIG. 14.

Referring to FIGS. 14 and 15, the comparing of the sensing value difference with the reference value (S420) may further include adjusting the reference value, based on stress data.

In an embodiment, stress data of each of pixels may be generated by accumulating image data (S421), and the stress data may be compared with a predetermined threshold value (S422).

When the stress data is equal to or smaller than the threshold value, a first value may be set as the reference value (S423).

When the stress data exceeds the threshold value, a second value greater than the first value may be set as the reference value (S424).

The adjusting of the reference value has been described in detail with reference to FIGS. 9 and 10, and therefore, overlapping descriptions will be omitted.

As described above, in the display device and the method of driving the same in the embodiments of the invention, only some of all pixels may be actually sensed in a sensing period, a sensing value of pixels which are not sensed may be calculated through interpolation, so that a pixel sensing time for external compensation may be decreased.

Further, a final sensing value of a target pixel may be determined according to a difference between an interpolated sensing value (e.g., a preliminary sensing value) of the target pixel and a previous real sensing value, so that occurrence of an interpolation error may be reduced while decreasing the sensing time. Thus, sensing reliability and image quality may be improved.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:

1. A display device comprising:

a plurality of pixels respectively connected to corresponding scan lines, corresponding control lines, corresponding data lines, and corresponding sensing lines;

a scan driver which supplies a scan signal to a scan line of the corresponding scan lines, and supplies a control signal to a control line of the corresponding control lines;

a data driver which supplies one of an image data signal and a sensing data signal to a data line of the corresponding data lines; and a sensing driver which senses characteristics of driving transistors of different pixels of the plurality of pixels in a previous sensing period and a current sensing period, and determines a final sensing value of a target pixel of the plurality of pixels in the current sensing period, based on a difference between a previous sensing value of the target pixel, which is determined based on the sensing in the previous sensing period, and a preliminary sensing value of the target pixel, which is calculated based on the sensing in the current sensing period.

2. The display device of claim 1, wherein the sensing driver calculates the preliminary sensing value of the target pixel by interpolating sensing values of pixels adjacent to the target pixel.

3. The display device of claim 2, wherein the previous sensing value of the target pixel is a real sensing value determined by a sensing signal provided from a sensing line, among the corresponding sensing lines, connected to the target pixel.

4. The display device of claim 1, wherein the sensing driver determines one of the previous sensing value and the preliminary sensing value as the final sensing value.

5. The display device of claim 1, wherein the sensing driver comprises an analog front end shared by at least two sensing lines of the corresponding sensing lines.

6. The display device of claim 5, wherein the sensing driver further comprises:

a sensing line controller which controls a connection between the at least two sensing lines of the corresponding sensing lines and the analog front end, to sense a first pixel group of the plurality of pixels in the previous sensing period and sense a second pixel group of the plurality of pixels in the current sensing period;

an analog-digital converter which outputs digital real sensing values of a plurality of second pixels included in the second pixel group, based on a signal provided from the analog front end in the current sensing period;

an interpolator which calculates preliminary sensing values of a plurality of first pixels which are included in the first pixel group and not sensed in the current sensing period by interpolating the real sensing values of the second pixel group;

a difference calculator which calculates a sensing value difference as the difference between the previous sensing value of the target pixel sensed in the previous sensing period and the preliminary sensing value of the target pixel; and a sensing value determiner which determines the final sensing value of the target pixel by comparing the sensing value difference with a predetermined reference value.

7. The display device of claim 6, wherein, when the sensing value difference is greater than the predetermined reference value, the sensing value determiner determines the previous sensing value of the target pixel as the final sensing value of the target pixel.

8. The display device of claim 6, wherein, when the sensing value difference is equal to or smaller than the predetermined reference value, the sensing value determiner determines the preliminary sensing value of the target pixel as the final sensing value of the target pixel.

9. The display device of claim 6, further comprising:

a memory which stores sensing line option information corresponding to pattern information of pixels sensed in the previous sensing period and the previous sensing value of each of the pixels, wherein the sensing line controller controls sensing lines selected in the current sensing period among the corresponding sensing lines, based on the sensing line option information, and wherein the difference calculator reads the previous sensing value of each of pixels except the second pixel group from the memory, corresponding to the current sensing period.

10. The display device of claim 9, wherein the sensing value determiner updates the final sensing value in the memory.

11. The display device of claim 6, further comprising:

a stress accumulator which accumulates stress data of each of the plurality of pixels, based on image data, wherein the sensing driver further comprises a reference value determiner which varies a reference value with respect to each of the plurality of pixels, based on the stress data.

12. The display device of claim 11, wherein, when the stress data of the target pixel is greater than a predetermined threshold value, the reference value determiner increases the reference value used for the target pixel.

13. The display device of claim 6, wherein the sensing driver further comprises a compensator which determines a compensation value of image data, based on the final sensing value.

14. The display device of claim 5, wherein the analog front end is shared by two sensing lines of the corresponding sensing lines.

15. A method of driving a display device, the method comprising:

outputting first sensing signals from a first pixel group of a first plurality of pixels in a previous sensing period, and generating a previous sensing value of each of a plurality of first pixels of the first pixel group, based on the first sensing signals;

outputting second sensing signals from a second pixel group different from the first pixel group in a current sensing period, and generating real sensing values of a plurality of second pixels of the second pixel group of the plurality of pixels, based on the second sensing signals;

calculating a preliminary sensing value of each of the plurality of first pixels of the first pixel group by interpolating the real sensing values, corresponding to the current sensing period;

determining a final sensing value of each of the plurality of first pixels of the first pixel group, based on a difference between the previous sensing value and the preliminary sensing value; and compensating for image data, based on the real sensing values and the final sensing value.

16. The method of claim 15, wherein the final sensing value of each of the plurality of first pixels of the first pixel group is determined as one of the previous sensing value and the preliminary sensing value.

17. The method of claim 16, wherein the determining the final sensing value includes:

calculating a sensing value difference as the difference between the previous sensing value and the preliminary sensing value;

comparing the sensing value difference with a predetermined reference value;

determining the previous sensing value as the final sensing value of a target pixel of the plurality of first pixels of the first pixel group, when the sensing value difference is greater than the predetermined reference value; and determining the preliminary sensing value as the final sensing value of the target pixel, when the sensing value difference is equal to or smaller than the predetermined reference value.

18. The method of claim 17, wherein the comparing the sensing value difference with the predetermined reference value includes:

generating stress data of each of the plurality of pixels by accumulating the image data;

comparing the stress data with a predetermined threshold value;

setting a first value as the predetermined reference value, when the stress data is equal to or smaller than the predetermined threshold value; and setting a second value greater than the first value as the predetermined reference value, when the stress data exceeds the predetermined threshold value.

19. A display device comprising:

a plurality of pixels respectively connected corresponding sensing lines; and a sensing driver which generates first real sensing values, based on sensing signals provided from a plurality of first pixels of a first pixel group of the plurality of pixels in a first sensing period, and generate second real sensing values, based on sensing signals provided from a plurality of second pixels of a second pixel group of the plurality of pixels in a second sensing period, wherein the sensing driver:

calculates a preliminary sensing value of a target pixel included in the plurality of first pixels of the first pixel group by interpolating the second real sensing values of a portion of the plurality of second pixels of the second pixel group, which are adjacent to the target pixel; and determines a final sensing value of the target pixel corresponding to the second sensing period, based on a difference between a real sensing value of the target pixel among the first real sensing values and the preliminary sensing value of the target pixel.

20. The display device of claim 19, wherein the sensing driver:

determines one of the real sensing value of the target pixel and the preliminary sensing value of the target pixel as the final sensing value of the target pixel; and compensates for image data of the target pixel, based on the final sensing value of the target pixel.

* * * * *